(12) United States Patent
Keller et al.

(10) Patent No.: US 6,199,000 B1
(45) Date of Patent: *Mar. 6, 2001

(54) METHODS AND APPARATUS FOR PRECISION AGRICULTURE OPERATIONS UTILIZING REAL TIME KINEMATIC GLOBAL POSITIONING SYSTEM SYSTEMS

(75) Inventors: Russell J. Keller; Mark E. Nichols; Arthur F. Lange, all of Sunnyvale, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/116,312

(22) Filed: Jul. 15, 1998

(51) Int. Cl.[7] ................................ G06F 7/70; G06G 7/78
(52) U.S. Cl. ...................... 701/50; 701/213; 342/357.13; 342/357.17
(58) Field of Search ............................ 701/50, 301, 207, 701/213, 214, 215; 364/167.01, 148; 340/937, 901, 436, 903, 905; 342/357.17, 357.13; 348/118, 169, 120; 111/903, 178, 200; 221/211, 278, 9

(56) References Cited

U.S. PATENT DOCUMENTS

| | | | |
|---|---|---|---|
| 5,673,637 | 10/1997 | Colburn, Jr. et al. ................ | 111/118 |
| 5,724,241 | 3/1998 | Wood et al. ......................... | 364/421 |
| 5,746,539 | 5/1998 | Mara .................................. | 404/84.05 |
| 5,754,137 | * 5/1998 | Durrstein ............................ | 701/50 |
| 5,764,510 | * 6/1998 | Cameron et al. ................... | 701/301 |
| 5,835,028 | * 11/1998 | Bender et al. ...................... | 701/301 |
| 5,838,277 | * 11/1998 | Loomis et al. ................... | 342/357.13 |
| 5,862,501 | * 1/1999 | Talbot et al. ....................... | 701/50 |
| 5,915,313 | * 6/1999 | Bender et al. ...................... | 701/50 |
| 5,919,242 | * 7/1999 | Greatline et al. .................. | 701/50 |
| 5,978,723 | * 11/1999 | Hale et al. .......................... | 701/50 |
| 5,987,383 | * 11/1999 | Keller et al. ....................... | 701/213 |

OTHER PUBLICATIONS

Trimble Navigation Limited, A New Era of Dual–frequency GPS Surveying, GPS Total Station 4800, Aug. 1997, 7 pages.

Trimble Surveying & Mapping Systems Group, "7400 MSi, High precision real–time GPS receiver for dynamic control systems", Jun. 1995, 2 pages.

Trimble Navigation, Limited, "AgGPS 122, Integrated DGPS Beacon Receiver", Jul. 1996, 1 page.

Trimble Facts Finder, "Second Annual Trimble Users Conference Issue Unifying the World of GPS", Trimble User Conference 1996, News & Information from Surveying & Mapping Fall 1996, 16 pages.

D. W. Seward, J. R. Ward, R. Dixon, J. D. Findlay, H. Kinniburgh, "Precise On–site Positioning of a Piling Rig", Trimble Surveying & Mapping, Conference Proceedings 1996, p. 183–189.

(List continued on next page.)

Primary Examiner—Jacques H. Louis-Jacques
(74) Attorney, Agent, or Firm—Blakely, Sokoloff, Taylor & Zafman LLP

(57) ABSTRACT

Real time kinematic (RTK) global positioning system (GPS) technology is integrated with precision farming methodologies to provide highly accurate seeding, cultivating, planting and/or harvesting operations. RTK GPS systems are used to control fully or semi-autonomous vehicles in these operations and may allow for precision planting of seeds (e.g., from a seeder equipped with an RTK GPS receiver and related equipment) and/or precision weed removal (e.g., using a vehicle fitted with weed eradication mechanisms such as augers and/or herbicide sprayers). Crop specific fertilizer/pesticide application is also enabled through the use of centimeter-level accurate positioning techniques.

40 Claims, 21 Drawing Sheets

OTHER PUBLICATIONS

David Waits, Stephen R. Johnson, Jr., "A Data Collection and Analysis Strategy for Agricultural Producers", Trimble Surveying & Mapping, Conference Proceedings 1996, p. 11–18.

Scott Weilt, Catherine Mansfields, "Using the 4600LS For Surveying and Mapping", Trimble User Conference 1996, p. 37–57.

Nicole Shawn Alexander, "Introduction To GPS For GIS Data Capture", Trimble User Conference 1996, p. 1–9.

Arthur F. Lange, Ph.D., "Introduction to Differential GPS for Precision Agriculture Applications", Trimble User Conference 1996, p. 246–250.

Arthur F. Lange, Ph.D., "GPS for Precision Agriculture: Accuracy Issues", Trimble Users Conference 1997, p. 1–6.

D. K. Giles, D. C. Slaughter, "Precision Band Spraying with Machine–vision Guidance and Adjustable Yaw Nozzles", Transactions of the American Society of Agricultural Engineers, vol. 40(1), p. 29–36 (1997).

Won Suk Lee, David C. Slaughter, D. Ken Giles, "Robotic Weed Control System for Tomatoes Using Machine Vision System and Precision Chemical Application", 1997 Annual International Meeting Sponsored by ASAE, Aug. 10–14, 1997, p. 1–15.

D. C. Slaughter, P. Chen, R. G. Curley, "Computer Vision Guidance System for Precision Cultivation", 1997 ASAE Annual International Meeting Sponsored by ASAE, Aug. 10–14, 1997, p. 1–18.

Dave Goddard, Dave Reid, "Radio Modems: Products, Tips and Techniques", Trimble User Conference 1996, p. 206–222.

Matt Parse, Mike Donnelly, "Real–Time GPS for GIS Applications", Trimble User Conference 1996, p. 89–120.

Raymond C. Daigh, "High Reliability Navigation for Autonomous Vehicles", Trimble Surveying & Mapping, Conference Proceedings 1996, p. 133–143.

Russ Keller, Genevieve Burk, "How to Use Trimble Products in Precision", Trimble Users Conference 1997, p. 7–16.

Trimble Navigation, Limited, "AgGPS 132, Combination DGPS receiver with The Choice technology", Jun. 1997, 1 page.

Hard copy of Web page entitled "Weed–It: a selective weed control system", downloaded May 8, 1909.

Hard copy of Web page entitled Ecological Efficiency and Plant Design, downloaded May 8, 1998.

Hard copy of Web page entitled "Precision Farming; An Introduction", Simon Blackmore, downloaded Jun. 4, 1998.

Hard copy of Web page entitled "Soil Doctor® System" Soil SensingL The Only On–the–Go Soil Analysis with A Decade of Grower–Documented Economic Benefits, downloaded May 18, 1998.

* cited by examiner

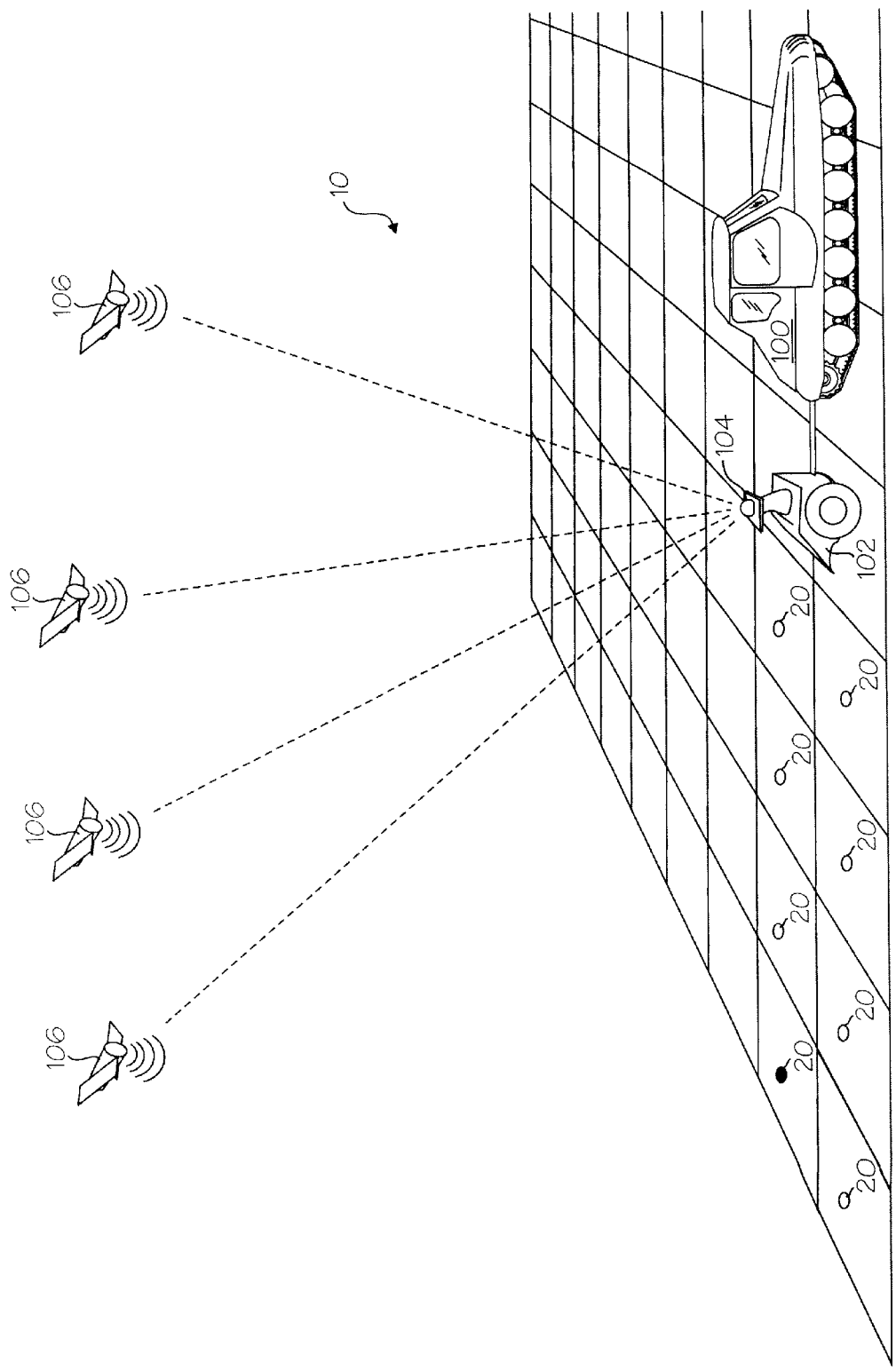

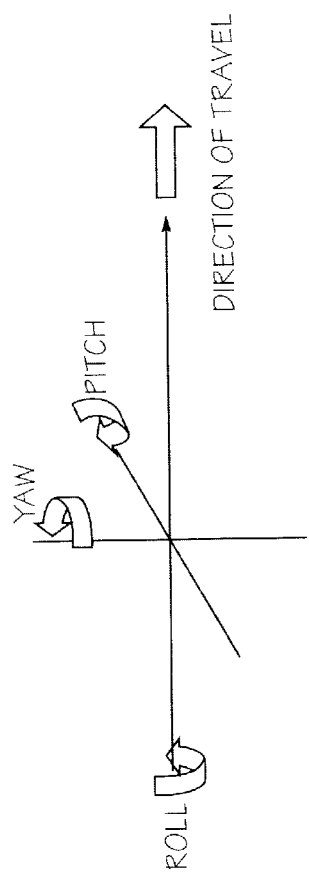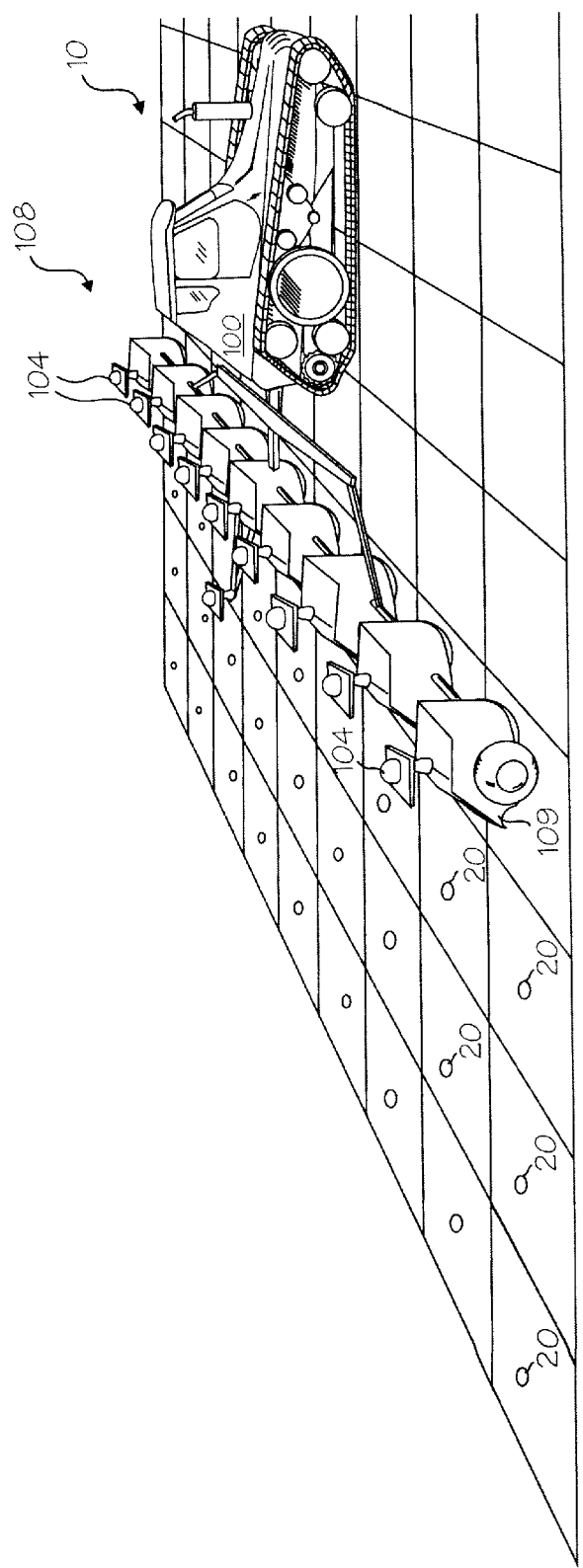
Fig. 2B

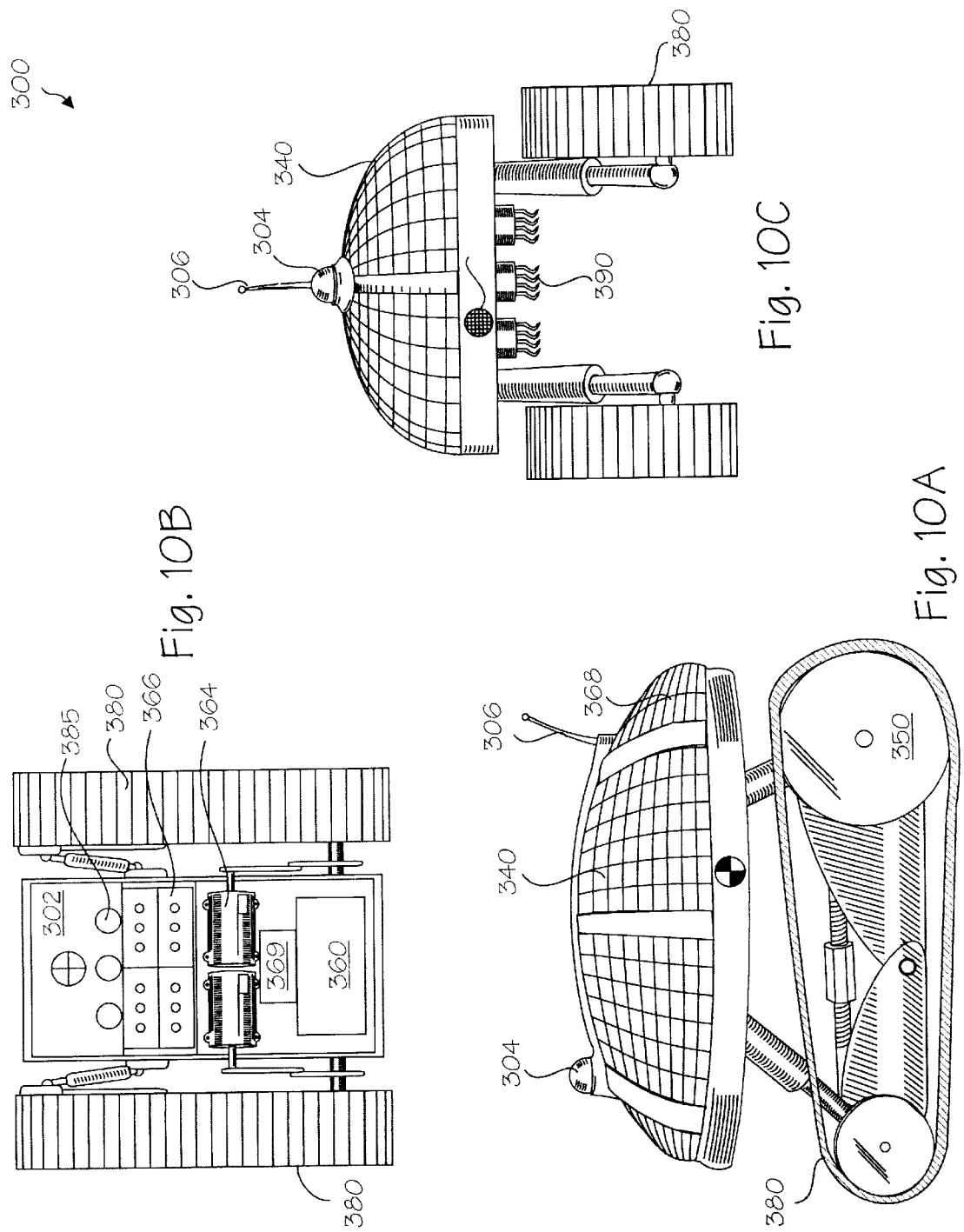

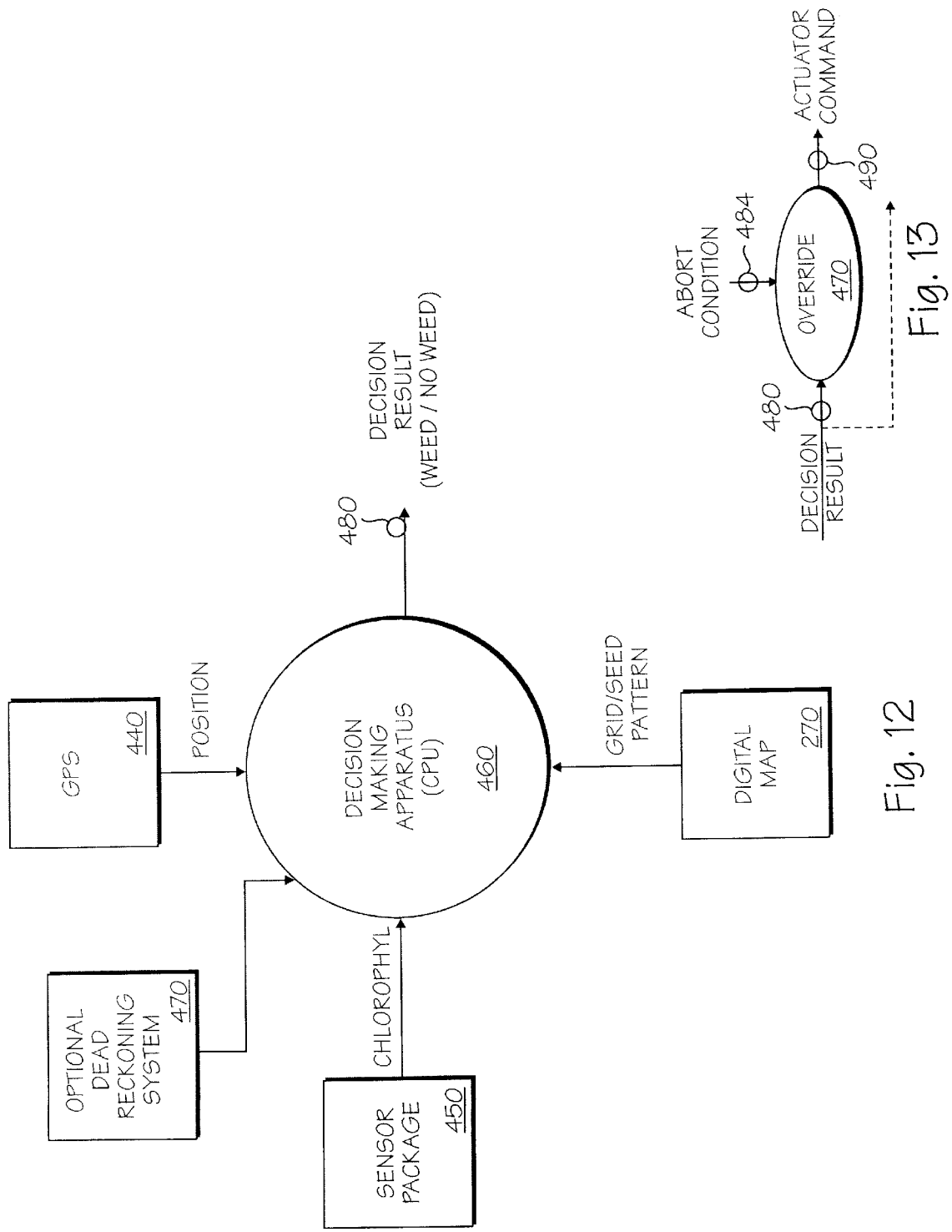

METHODS AND APPARATUS FOR PRECISION AGRICULTURE OPERATIONS UTILIZING REAL TIME KINEMATIC GLOBAL POSITIONING SYSTEM SYSTEMS

FIELD OF THE INVENTION

The present invention relates to improvements in precision farming methodologies through the use of highly accurate positioning information systems.

BACKGROUND

In modern agricultural industries, accuracy is essential. Accurate record keeping, automated mapping, and precision farming techniques have all become crucial factors in the challenge to improve overall crops yields and comply with the ever increasing number of environmental regulations. The accurate application of herbicides, pesticides and fertilizers is an essential component of modern precision farming methodologies. Whether such applications are performed by aerial or terrestrial techniques, advanced tools that provide highly accurate navigation and guidance information for operators have become a requirement.

The transfer of global positioning system (GPS) technologies to civilian industry has greatly assisted in meeting the challenges presented by today's precision agricultural needs. Using GPS systems, accurate and highly reliable satellite-based positioning information, which typically achieves meter-level accuracy by utilizing differential GPS (DGPS) position corrections transmitted from fixed base stations, is provided to operators, for example though moving map displays. Such information allows for navigation and guidance of farm implements and systems utilizing DGPS technology have been used to assist in the aerial and terrestrial application of fertilizers, herbicides and pesticides, etc. However, such systems have generally been limited in their capabilities.

Moreover, even though these limited precision agricultural methodologies have become popular with the commercialization of GPS systems, to date such methodologies have not included the use of real time kinematic (RTK) GPS equipment which allows for centimeter-level accuracy.

SUMMARY OF INVENTION

In one embodiment, an apparatus which includes a sensor-controller arrangement configured to identify a target according to a sensor input and a position input is provided. The apparatus may be self-propelled (in which case it may include its own propulsion unit) or it may be arranged for towing, for example, by a tractor. In either case, the target may be plant growth (e.g., weeds, crops, etc.).

Preferably, the position input is provided by a global positioning system (GPS) receiver, for example, a real time kinematic (RTK) GPS receiver. The sensor input may be provided by a chlorophyll detector, a video camera and/or an infra-red detector.

The apparatus may also include a plant eradication mechanism, for example a herbicide sprayer and/or an auger. Where self-propelled, the apparatus may include a collision avoidance sensor (e.g., an ultrasonic or infra-red detector) coupled to the sensor-controller arrangement.

In general, the sensor-controller arrangement includes a decision-making unit coupled to receive the sensor input and the position input. The decision-making unit (e.g., a general purpose or special purpose microprocessor) is configured to use these inputs, along with reference position information, to classify the target (e.g., as a weed, a crop plant or otherwise). The reference position information may be obtained from a digitized map of an area of operation for the apparatus, for example, which may be stored in memory accessible by the decision-making unit. Preferably, the digitized map will include information defining desired plant growth regions so as to aid in classifying the target as desired plant growth (e.g., crops) or otherwise (e.g., weeds).

When undesired plant growth is detected, the sprayer apparatus may be used, for example with control signals from the sensor-controller arrangement, to apply a herbicide thereto. Alternatively, or in addition thereto, the auger may be used, again under the control of the sensor-controller arrangement, to uproot the undesired plant growth. In some cases, the sprayer apparatus may be configured to dispense a fertilizer and/or a pesticide in addition to (or instead of) the herbicide. Thus, while eliminating undesired plant growth, the apparatus may also be used to fertilize desired plant growth and/or apply pesticides to selected areas to control pests.

In a further embodiment, a vehicle which includes a precise positioning apparatus, for example a real-time kinematic global positioning system receiver, configured to provide real-time precise positioning information regarding the location of the vehicle; and a sensor-controller apparatus configured to detect a target, at least in part, according to the location of the vehicle is provided. A propulsion unit may be included and such a propulsion unit may be configured to transport the vehicle under the control of the sensor-controller apparatus. Collision avoidance sensors may be coupled to the sensor-controller apparatus to provide for obstacle detection and/or avoidance. In general, the sensor-controller apparatus includes a sensor package configured to detect a characteristic of the target (e.g., chlorophyll, for the case where the target is undesired plant growth) and a decision-making apparatus coupled thereto. The decision-making apparatus is configured to combine inputs from the sensor package, the precise positioning apparatus and a digital map of an operating area in which the vehicle operates to produce a decision output. An actuator within the vehicle is configured to respond to the decision output of the decision-making apparatus. In one particular embodiment, the actuator comprises weed removal means which may include a herbicide deploying mechanisms and/or an auger. In another particular embodiment, the actuator comprises lane marker depositing means which may be used to place lane markers on a roadway.

In still further embodiments, seeding methodologies are provided. In one particular example, a first seeding line may be predefined or may be defined by user during seeding operations. A second seeding line is then computed using positioning data obtained while following the first seeding line and a swathing offset corresponding to the width of a seeding pattern. The second seeding line may be updated according to one or more deviations from its computed path.

The deviations may correspond to operator inputted corrections which allow for obstacle avoidance, etc. The updating generally occurs as users follow the second seeding line as defined by the positioning data and the swathing offset and then deviate from the second seeding line to accommodate one or more terrain features. New GPS data is collected during these steps of following and deviating from the second seeding line (as computed) and new positions are computed from the new GPS data. Finally, the updated second seeding line is redefined using the new positions computed from the new GPS data and a further seeding line may then be defined using the updated second seeding line information and the swathing offset.

In another alternative embodiment, a seeder which includes a vehicle fitted with an RTK GPS receiver configured to receive GPS data and RTK GPS correction information and to compute position information therefrom is provided. The seeder may include a processor configured to receive the position information and to compute seeding line information therefrom. The processor may be part of the GPS receiver or it may be a separate unit. The processor is also configured to update the seeding line information in response to seeding line deviation information. The seeding line deviation information may come, for example, from operator inputted corrections to accommodate various terrain features. The seeder may also include a display device configured to receive and display the seeding information. The display device may include a moving map display and/or a light bar display, either or both of which allow an operator to follow a computed seeding line path.

Other features and advantages of various embodiments of the present invention will be evident from the detailed description which follows.

BRIEF DESCRIPTION OF THE DRAWINGS

Exemplary embodiments of the present invention are illustrated by way of example, and not limitation, in the Figures of the accompanying drawings in which:

FIG. 2A illustrates a crop seeding operation which may be performed in accordance with an exemplary embodiment of the present invention;

FIG. 2B illustrates a seeding apparatus configured in accordance with the methods and apparatus of the present invention;

FIGS. 10A–10C illustrates the autonomous vehicle shown in FIG. 9 in more detail;

FIG. 12 is a block diagram representing one embodiment of an autonomous vehicle control system;

FIG. 13 illustrates an optional override feature for use with the autonomous vehicle control system of FIG. 12;

DETAILED DESCRIPTION

The precision agriculture systems and methodologies described below may find application in crop spraying operations, harvesting operations, ploughing operations, planting/seeding operations, mining operations, mineral prospecting, or other applications where real-time correction information is provided to allow highly accurate positioning determinations to be made. Moreover, although the various methods and apparatus will be described with particular reference to GPS satellites, it should be appreciated that the teachings are equally applicable to systems which utilize pseudolites or a combination of satellites and pseudolites. Pseudolites are ground- or near ground-based transmitters which broadcast a pseudorandom (PRN) code (similar to a GPS signal) modulated on an L-band (or other frequency) carrier signal, generally synchronized with GPS time. Each transmitter may be assigned a unique PRN code so as to permit identification by a remote receiver. Pseudolites are useful in situations where GPS signals from an orbiting satellite might be unavailable, such as tunnels, mines, buildings or other enclosed areas or in areas of significant foliage. The term "satellite", as used herein, is intended to include pseudolites or equivalents of pseudolites, and the term GPS signals, as used herein, is intended to include GPS-like signals from pseudolites or equivalents of pseudolites.

It should be further appreciated that the methods and apparatus of the present invention are equally applicable for use with the GLONASS and other satellite-based positioning systems. The GLONASS system differs from the GPS system in that the emissions from different satellites are differentiated from one another by utilizing slightly different carrier frequencies, rather than utilizing different pseudo-random codes. As used herein and in the claims which follow, the term GPS should be read as indicating the United States Global Positioning System as well as the GLONASS system and other satellite- and/or pseudolite-based positioning systems.

In addition, the precision agriculture methodologies and accompanying methods and apparatus described herein may be supplemented with non-satellite based guidance systems, such as inertial navigation systems, distance and gyro compass and/or other heading and/or attitude indicator systems (e.g., accelerometer-based yaw, pitch and/or roll sensors), laser range finding and bearing indicator systems, etc. The use of such systems to assist in terrestrial navigation is well known in the art and will not be described further so as not to unnecessarily obscure the following discussion. It should be recognized that such systems could supplement (at least to some degree) the GPS-based systems described in detail below and would be particularly useful, for example, in situations where satellite-based positioning signals are unavailable (e.g., under foliage, behind hills or buildings, in valleys, mines, etc.).

Figure 1:
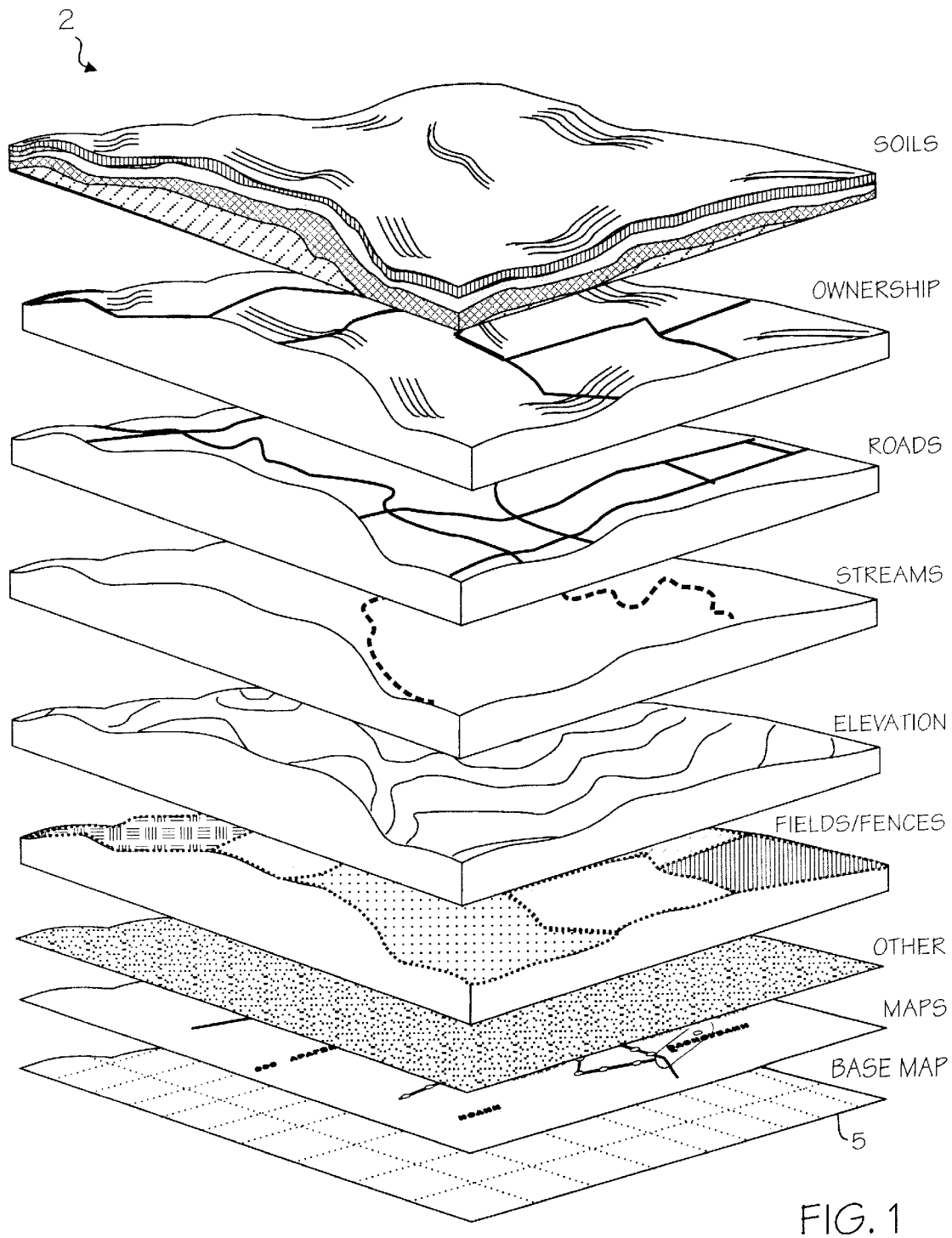
FIG. 1 illustrates a geographic information system data structure as may be used by various embodiments of the present invention.

In part, the various methods and apparatus described below may make use of or assist in the construction of a geographic information system (GIS). A GIS is a system of hardware, software and geographic data designed to support the capture, management, manipulation, analysis, modeling and display of spatially referenced data for solving complex planning and management problems. One purpose of a GIS can be to find or assist in finding solutions to problems by using both geographic and tabular data. To illustrate, shown in FIG. 1 is an exemplary GIS 2 (which may exist as a data structure stored on/in any suitable computer-readable medium, for example, volatile or non-volatile memory, magnetic tape, other magnetic media, electro-optical recording media, or any other suitable media) which includes information relating to various soil types and/or conditions, ownership (e.g., property boundaries), roads, streams, elevations, fields, and other field and/or crop data, all of which may be overlaid on a base map 5 of an agricultural field of interest. It should be appreciated that GIS 2 may reside on or be accessible via a server that is capable of being accessed by a number of clients (e.g., via one or more computer networks and/or the internet). The information provided by GIS 2 in the course of various precision farming operations may be utilized by one or more RTK GPS systems. In this way, a user will have information regarding the application of the various chemicals (e.g., herbicides, pesticides and/or fertilizers) at points of interest on the field, the planting of crops at precise locations (e.g., with respect to irrigation sources and/or for highly accurate (e.g., centimeter-level) crop rotation within a field), etc. This may assist farmers and others who rely on this information (or on information which can be extrapolated therefrom, e.g., expected crop yields) in various precision agricultural operations as will be discussed in detail below. Alternatively or in addition, the information provided by GIS 2 may be uploaded to higher level GIS data structures for use in strategic planning operations regarding large areas of crop growth.

FIG. 2A illustrates a planting or seeding operation which may be performed in accordance with the methods described herein in an agricultural field 10 or other area of interest. As used herein, the terms seeding and/or planting are meant to describe any deposition of plant material, including seeds, seedlings, bulbs, etc. in soil or other mediums. Similarly, the term seed as used herein is meant to describe or refer to seeds, bulbs, seedlings and/or other plant material. The seeding operation is shown to illustrate one use of an RTK GPS receiver in the development of a digital map of the agricultural field 10. The map defined through this operation may become the base map 5 or other overlay of GIS 2 and/or may become a control feature for a machine guidance and/or control system to be discussed in further detail below. Conceptually, the development of a digital map may occur through any of a number of means. For example, the map could be established using satellite, aircraft or other overhead imagery wherein a detailed representation of a portion of the surface of the earth, or other planetary body for that matter, is photographed at high resolution. The photographs may then be digitized to produce the map.

Alternatively, the area could be transited by a fully or semi-autonomous vehicle, similar to that described below, and position data recorded using an RTK GPS apparatus and a suitable feature collection system such as the Aspen GIS data capture system available from Trimble Navigation, Ltd.

of Sunnyvale, Calif. Still further, a combination of these methods may be used to produce the digital map. However produced, the map should be of sufficient resolution so that the precise location of a vehicle within the area defined by the map can be determined to a few centimeters with reference to the map. Currently available RTK GPS receivers, for example as produced by Trimble Navigation, Ltd., are capable of such operations.

For the operation shown in FIG. 2, a tractor or other vehicle 100 is used to tow a seeder 102 across field 10. Seeder 102 is fitted with an RTK GPS receiver 104 which receives transmissions from GPS satellites 106 and an RTK reference station (not shown). Also on-board seeder 102 (although not shown in detail) is a monitoring apparatus which records the position of seeds 20 as they are planted by seeder 102. In other words, using precise positioning information provided by the RTK GPS receiver 104 and an input provided by seeder 102, the monitoring apparatus records the location at which each seed is deposited by seeder 102 in field 10.

As tractor 100 proceeds across field 10, for example to plant various rows of seeds or crops, a digital map is established wherein the location of each seed planted in field 10 is stored. Such a map or other data structure which provides similar information may be produced on-the-fly as seeding operations are taking place. Alternatively, the map may make use of a previously developed map (e.g., one or more maps of GIS 2 produced from earlier seeding operations, etc., or from satellite imagery). In such a case, the previously stored map may be updated to reflect the position of the newly planted seeds. Indeed, in one embodiment GIS 2 is used to determine the proper location for the planting of the seeds/crops.

In such an embodiment, relevant information stored in GIS 2, for example the location of irrigation systems and/or the previous planting locations of other crops, may be used to determine the location at which the new crops/seeds should be planted. This information is provided to seeder 102 (e.g., in the form of radio telemetry data, stored data, etc.) and is used to control the seeding operation. As seeder 102 (e.g., using a conventional general purpose programmable microprocessor executing suitable software or a dedicated system located thereon) recognizes that a planting point is reached (e.g., as the seeder 102 passes over a position in field 10 where it has been determined that a seed/crop should be planted), an onboard control system activates a seed planting mechanism to deposit the seed (e.g., through an air nozzle or other planting means). The determination as to when to make this planting is made according to a comparison of the seeder's present position as provided by RTK GPS receiver 104 and the seeding information from GIS 2. For example, the GIS information may accessible through an index which is determined according to the seeder's current position (i.e., a position-dependent data structure). Thus, given the seeder's current location, a look-up table or other data structure can be accessed to determine whether a seed should be planted or not.

In cases where the seeding operation is used to establish the digital map, the seeding data need not be recorded locally at seeder 102. Instead, the data may be transmitted from seeder 102 to some remote recording facility (e.g., a farmhouse or other central or remote workstation location) at which the data may be recorded on suitable media. The overall goal, at the end of the seeding operation, is to have a digital map which includes the precise position (e.g., to within a few centimeters) of the location of each seed or other item planted. As indicated, mapping with the GPS- RTK technology is one means of obtaining the desired degree of accuracy.

An alternative seeding method which makes use of multiple seeding units is illustrated in FIG. 2B. In this embodiment, tractor 100 tows an implement 108 which includes multiple seeder units 109. Each seeder unit (or a number of the seeder units) 109 is fitted with one RTK GPS receiver 104 (or each or some of the seeder units may be fitted with an antenna and each of the antennas multiplexed with a single or a number of RTK GPS receivers). By utilizing multiple antennas and/or RTK GPS receivers in this fashion, the attitude of implement 108, as well as its heading, speed and location, may be determined. Indeed, attitude in any of the yaw, pitch or roll axes may be determined. In other embodiments, roll, pitch and/or yaw sensors which make use of accelerometers or other similar devices may be employed in lieu of or in addition to the multiple antenna and/or receivers. Using the attitude information, along with the location and other position/speed information, one may determine (with centimeter-level accuracy) the positions 20 at which seeds are planted from each of the seeder units 109. Each of the seeder units may be configured as described below.

More particularly, the attitude of implement 108 may be computed by comparing the position solutions produced by each of the RTK GPS receivers 104. For example, if the position solutions indicate that some of the seeder units 109 are ahead of others (as measured in the direction of travel of implement 108), this would indicate a rotation of implement 108 about its yaw axis. If seeder units 109 at one end of implement 108 were above or below seeder units 109 at the other end of implement 108, this would indicate rotation of implement 108 about its roll axis. For the linear arrangement of seeder units 109 shown in FIG. 2B significant pitch would not be expected, however, such could be measured in other embodiments (e.g., where seeder units 109 were staggered about a center-line of implement 108 along its length or where seeder units 109 were arranged in a two-dimensional array, etc.). Also, hogging and/or sagging of seeder units 109 in the middle portion along the length of implement 108 could also be measured. Each of these measurements may provide increased accuracy in determining the resulting seeding pattern.

Figure 3:
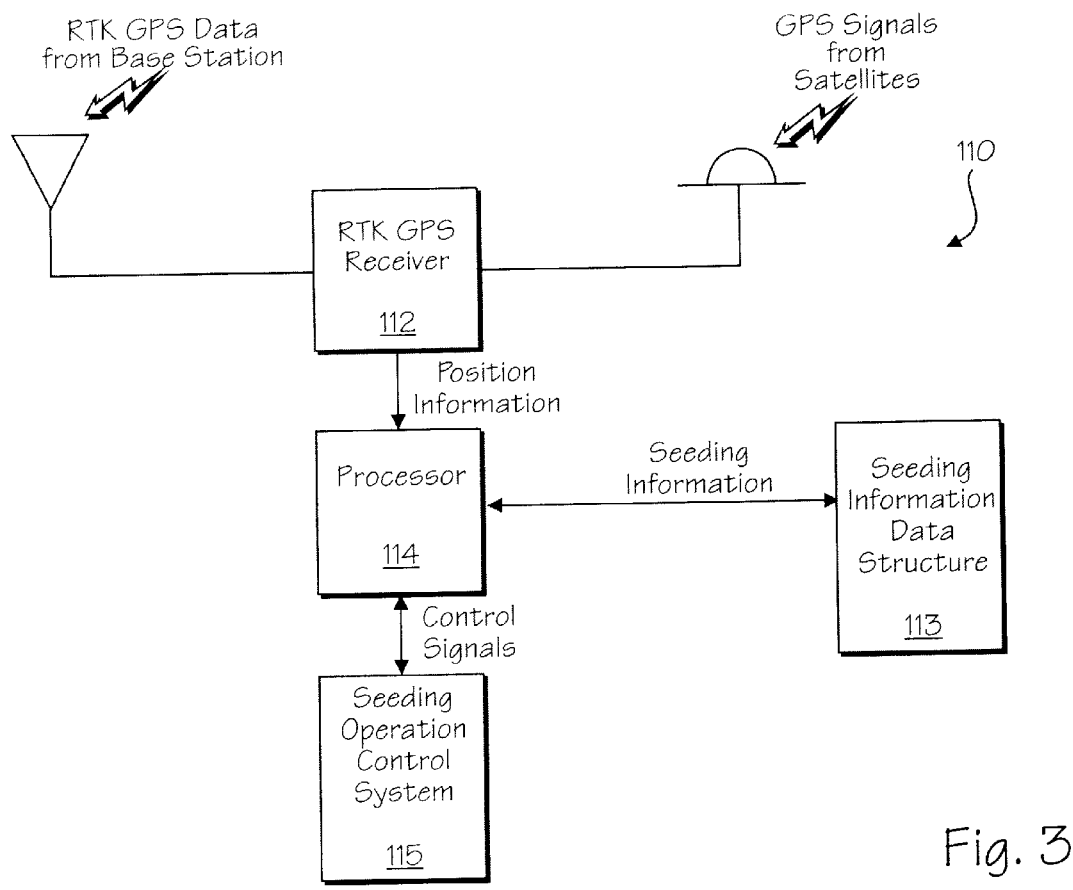
FIG. 3 illustrates functional components of a seeder configured in accordance with one embodiment of the present invention.

FIG. 3 is a functional illustration of a seeding apparatus which may be used to plant seeds and/or crops, etc. at precise locations according to information from GIS 2 in further detail. Seeder 110 is generally provided as a vehicle fitted with a GPS receiver 112 configured to receive GPS data and GPS correction information (i.e., RTK GPS information) and to compute position information therefrom. A processor 114 (which may be part of the GPS receiver or a separate unit) or other decision-making unit is configured to receive the position information from GPS receiver 112 and seeding information from a seeding information data structure 113 (e.g., as may be stored in memory). Seeding information data structure 113 may be GIS 2 or a portion thereof and may be stored locally at seeder 110 as discussed above (although it need not be, e.g., where the seeding information is relayed via radio or other link). Further, if the seeding information is stored locally at seeder 102, it need not be in the form of the complete GIS 2. Instead, it may merely be organized as a data structure which includes the positions at which seeds/crops are to be planted (e.g., a conventional look-up table arrangement). Further, the processor 114 may be configured to update the GIS seeding information with more accurate actual planting locations.

Figure 4:
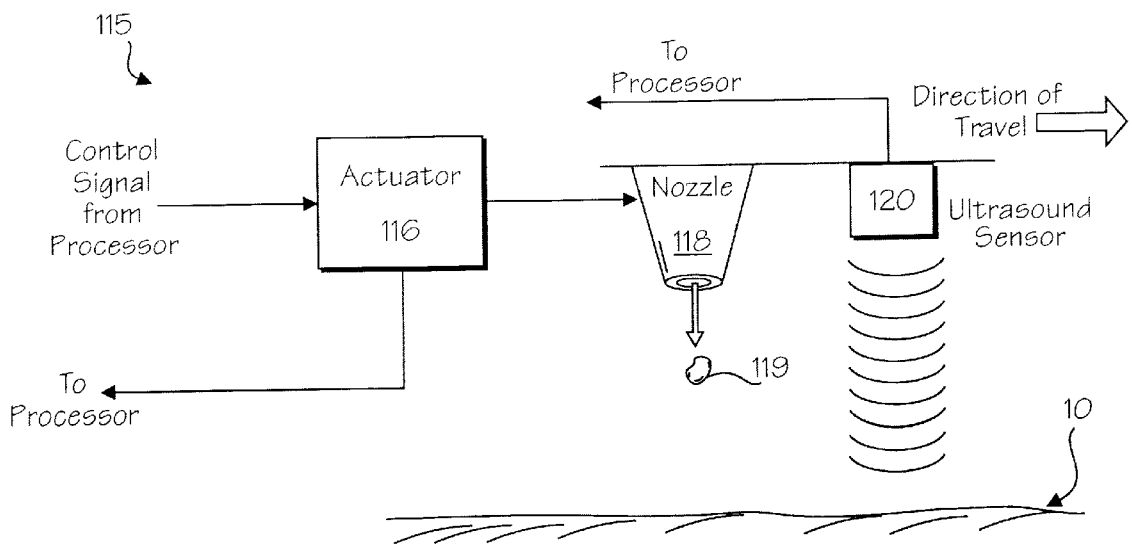
FIG. 4 illustrates actuator components of a seeder configured in accordance with a further embodiment of the present invention.

Seeder 110 also includes a seeding operation control system 115. In response to control signals from processor 114, the seeding operation control system 115 deposits seeds/crops, etc. FIG. 4 illustrates one exemplary embodiment of seeding operation control system 115 in more detail. In response to a control signal from processor 114 (or receiver 112 where no separate processor 114 is used), actuator 116 operates nozzle (air or water) 118 to deposit one or more seeds 119 in field 10. A supply of seeds 119 will be available onboard seeder 110 and nozzle 118 is configured to eject seed 119 with sufficient velocity to become planted in field 10 (e.g., in a small furrow tilled by a preceding blade or similar instrument) in response to a signal from actuator 116. This may be an electrical and/or mechanical signal. Actuator 116 may return a seeding signal to processor 114 to indicate that a seed has been planted, thus allowing processor 114 to update seeding information data structure 113 as appropriate.

Also shown in FIG. 4 is optional ultrasonic sensor 120. Ultrasonic sensor 120 may be positioned ahead of nozzle 118 in the direction of travel of seeder 110. As seeder 110 passes over field 10, ultrasonic sensor 120 may provide processor 114 with ground profile information (i.e., height above ground). In this way, processor 114 can time the release of seed 119 appropriately, for example to compensate for undulating terrain. In this way, seed 119 can be planted as closely as possible to the desired location therefor as specified in seeding information data structure 113.

Figure 5:
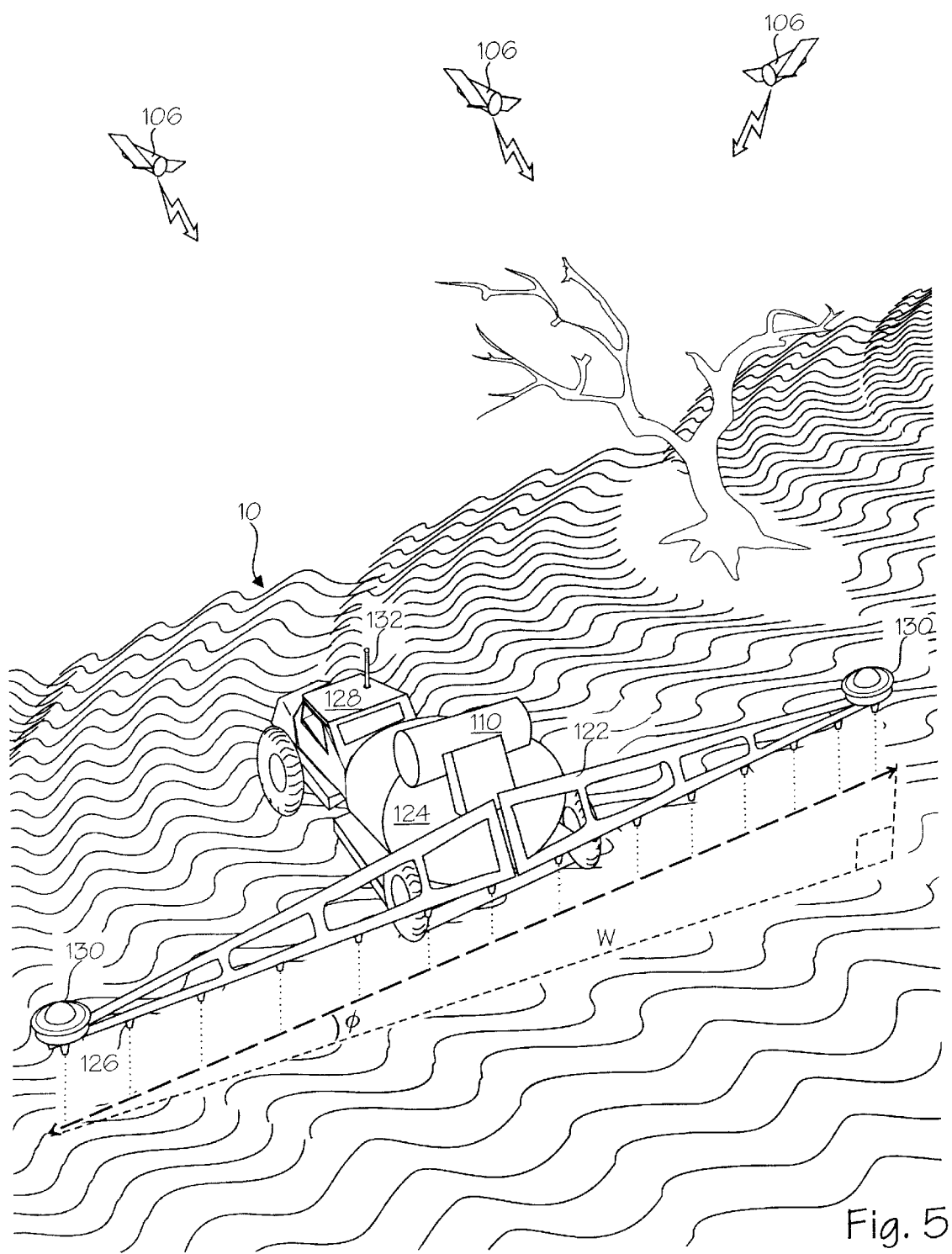
FIG. 5 illustrates yet another embodiment of a seeder apparatus.

As shown in FIG. 5, seeder 110 may be configured as a boom 122 which allows delivery of seeds to a variety of locations during a single pass through field 10. The seeds may be stored in a tank assembly 124 and delivered through nozzles 126 which are present in boom assembly 122. Various controls in the cab of tractor 128 which tows seeder 110 allow an operator to control seeder 110 and its related equipment.

Boom 122 may be fitted with one or more GPS antennas 130 which receive GPS data from one or more GPS satellites 106. GPS receiver 112 is capable of interpreting the GPS data received through antennas 130 so as to provide position/guidance information. GPS antennas 130 are mounted on seeder 110 so as to have a clear view of the sky. This will ensure that antennas 130 are capable of capturing signals from GPS satellites 106. Multiple antennas (e.g., two or more) may also be used to determine attitude in one or more dimensions, as may be desirable. Methods for determining attitude using multiple antennas are disclosed in U.S. Pat. Nos. 5,268,695 and 5,296,861, each of which are incorporated by reference herein in their entireties. Signals from antennas 130 are provided to GPS receiver 112 which may be mounted inside seeder 110 or at another convenient location such as on/in tractor 128. Boom 122 attitude is easily determined in the vertical plane of the boom. Additional antennas can be mounted at the center of boom 122 or on tractor 128 to aid in determining heading, as discussed in the above-referenced patents.

Receiver 112 may also receive RTK GPS information through antenna 132 from an RTK base station (not shown). GPS receiver 112 uses the GPS data provided through antennas 130 from the GPS satellites 106 and the RTK GPS information received through antenna 132 to compute position information for seeder 110. The position information corresponds to the terrestrial location of seeder 110 at the time the GPS data is collected. Such position computations may occur periodically, for example, several times each second. Using RTK GPS correction techniques common in the art, centimeter-level position accuracy may be obtained.

Figure 6:
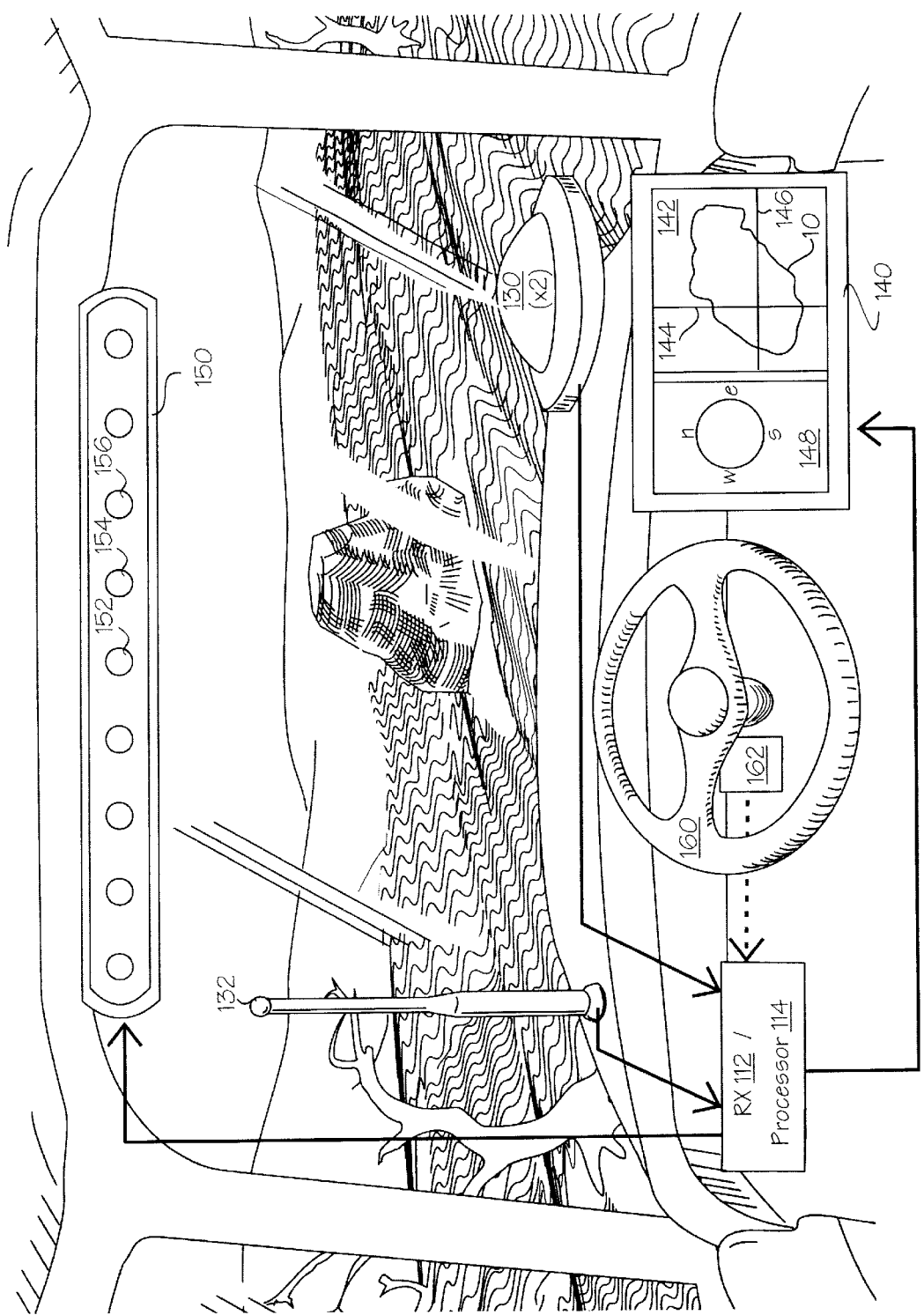
FIG. 6 illustrates various operator controls and components for a seeder configured in accordance with an embodiment of the present invention.

Now referring to FIG. 6, some of the operator controls mentioned above are shown in further detail. The position information computed by GPS receiver 112 may be processed and provided to a display device 140. Display device 140 may include a moving map display 142 which allows an operator to determine the precise location of seeder 110 with respect to the boundaries of field 10. As illustrated, field 10 has some irregular boundaries and the intersection of crosshairs 144 and 146 define the position of seeder 110 within field 10. The process for generating such moving map display information is well known in the art and need not be described further. Also included on display device 140 may be a compass rose or heading indicator 148. Heading indicator 148 generally indicates the direction that seeder 110 is traveling. Through the use of moving map display 142 and heading indicator 148, an operator is provided with simple and effective information to control seeding operations within field 10.

In addition to the above, a multi-function light bar 150 may be included within tractor 122. The multi-function light bar 150 receives guidance information from GPS receiver 112 or processor 114 and provides clear and immediate guidance information/commands to an operator of tractor 122 through a row of light emitting diodes (LEDs). These LEDs are used to alert an operator when seeder 110 has deviated from a computed seeding path (e.g., which may be derived from the desired seeding pattern stored as part of GIS 2 or may be derived from user manipulation of other data stored in GIS 2). The sensitively of light bar 150 (i.e., the deviation required before an LED will be illuminated to indicate that seeder 110 is straying from the computed path) may be operator configured for various types of seeding operations and field conditions. In addition, the light bar 150 may have a text screen (not shown) to display user selected information such as the tractor speed, etc. In other embodiments, multi-function light bar 150 may be replaced by a liquid crystal or other display device configured to provide similar course guidance and/or correction information.

During seeding operations, LED 152 will be lit when seeder 110 is following a computed seeding path as described below. As seeder 110 deviates from the computed seeding path, offset indicator LEDs 154, 156, etc. will be lit to indicate the degree (or distance) of deviation from the computed path. Note that LEDs 154, 156, etc. will be lit if seeder 110 deviates to the right of the computed path and corresponding LEDs on the other side of LED 152 will be lit if seeder 110 deviates to the left of the computed path. Alternatively, LEDs 154, 156, etc. may be lit to indicate that seeder 110 should be steered to the right to get back to a computed seeding line path, etc. The times at which the LEDs will be lit may be user configured. For example, LED 154 may be lit when seeder 110 has deviated by two to three feet from the computed seeding path. Then, if seeder 110 continues to deviate, for example to five feet from the computed seeding line path, LED 156 may be lit. In other situations, LED 154 may not be lit until a five foot deviation has been recognized. In this way, the user is provided with information which allows him or her to correct the path of seeder 110 back to that of the computed seeding path.

Operator corrections and steering controls are input through steering wheel 160. The tractor 122 may be configured with a steering input option which allows steering commands to be transmitted from a steering apparatus 162 to GPS receiver 112 or processor 114. Steering apparatus 162 provides information regarding the steering inputs through steering wheel 160 so that GPS receiver 112/processor 114 can be provided with real-time update information (e.g., the above-described deviations). Using the various steering commands provided through steering input apparatus 162, GPS receiver 112/processor 114 can provide appropriate display information to display device 140 and light bar 150. In other embodiments, other heading sensors such as a gyro compass or flux-rate gyro compass may provide the update information to GPS receiver 122. For the case where no steering information is used, the tractor 122 may rely on updated position information derived from GPS data received from the GPS satellites to compute and provide the display information.

Figure 7:
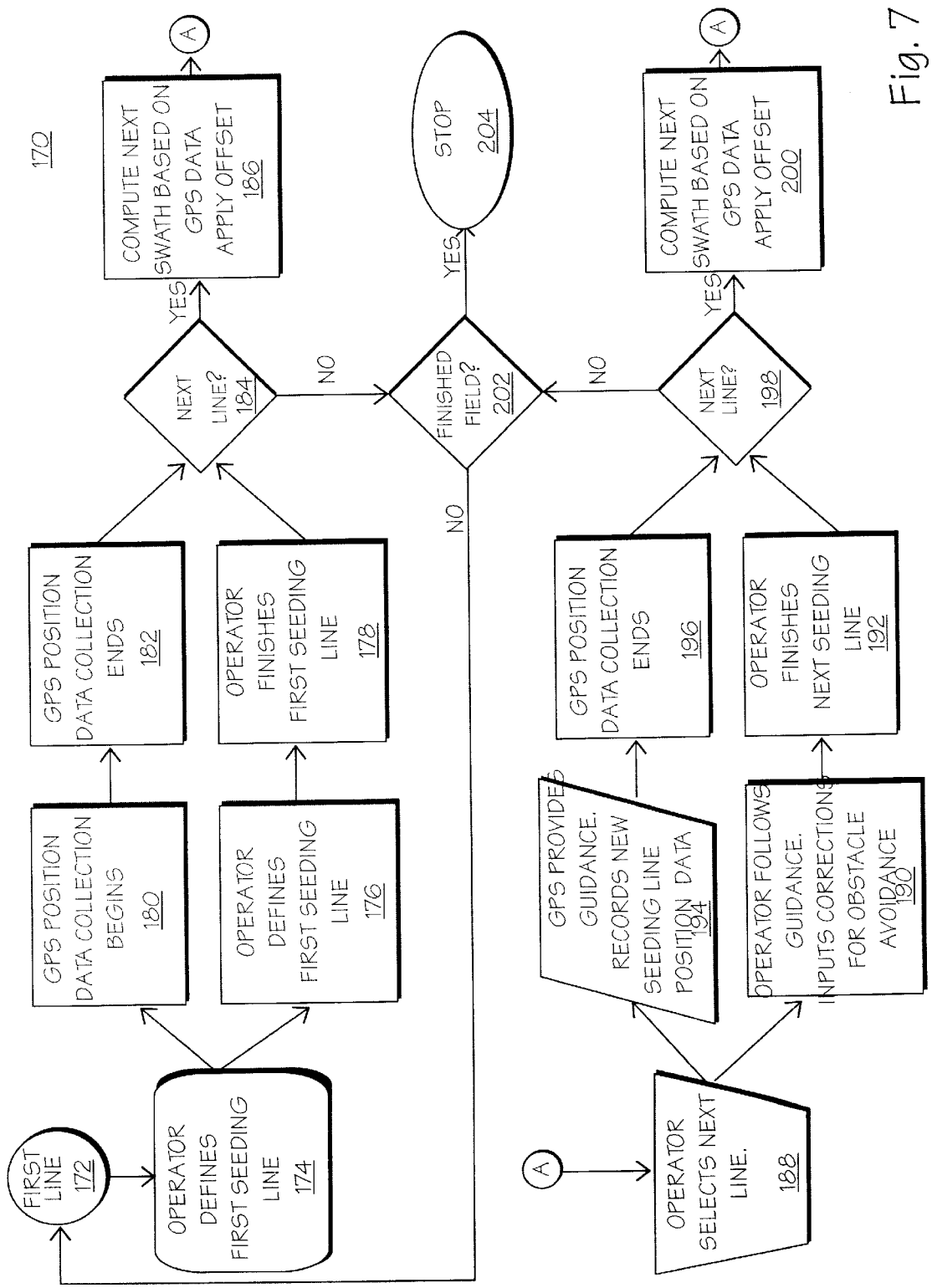
FIG. 7 is a flow diagram illustrating one exemplary manner of performing crop seeding according to one embodiment of the present invention.

FIG. 7 illustrates a general computation scheme which may be utilized by GPS receiver 112 (or processor 114) in accordance with the present invention. Seeding process 170 starts at step 172 when an operator begins the pass through filed 10. From step 172 the process moves to step 174 where an operator defines the seeding line. This may be done as seeder 110 is driven across field 10 using GPS receiver 112 to collect and store position information or by down loading a previously computed seeding map (e.g., which may be part of GIS 2). In one embodiment, the operator defines the first seeding line by driving across field 10 (or at least over that portion of field 10 that is to be seeded), for example following a fence line, a crop boundary line or a natural contour in the land, at step 176. This process finishes at step 178 when the first seeding line path has been completed. During this process, GPS data is collected at a variety of geographic locations at step 180. Then, at step 182, the GPS data collection ends when the first seeding line has been completed.

Data collection during the definition of the first seeding line may occur as seeder 110 is driven across field 10, with GPS data being collected at a number of points. The distance between these GPS data collection points is variable and will typically correspond to sub-meter, even centimeter, distances. The GPS data collected at each point is processed along with the RTK GPS information and a series of terrestrial positions are computed. These positions (when linked together, e.g., by a straight or curved line approximation) will define the first seeding line—that is, the path followed by seeder 110 as it maneuvered across field 10. In this way, GPS receiver 112, or processor 114, computes a first seeding line which corresponds to the actual path traveled by seeder 110.

If additional seeds are to be planted, a decision made at step 184, GPS receiver 112 (or processor 114) may compute a new seeding line (or swath) to be followed, based on the GPS data collected while seeder 110 traversed across the first seeding path (step 186). An offset due to, for example, the effective seeding width (W) of boom assembly 122 is also taken into account so that portions of field 10 are not seeded a second time. The computed new seeding line may be used to generate guidance information for the operator of seeder 110. For example, as the operator turns seeder 110 around to follow a return path across field 10 (step 188), the actual position of seeder 110 (as determined by new GPS position information received by GPS receiver 112) is compared with its expected position (i.e., the second seeding line information computed as described above). If the actual position agrees with the expected position, the operator is so advised, for example by the illumination of LED 152 in light bar 150. This continues as seeder 110 is driven back across field 10 with new GPS data being constantly collected and the actual position of seeder 110 being constantly checked against its expected position. As deviations from the expected positions are noted, display information is provided to the operator to allow guidance corrections as discussed above (step 190).

During the next seeding line, the operator follows the guidance information computed by GPS receiver 112/processor 114 and displayed on moving map display 142 and heading indicator 148 and also on light bar 150. During this time, the operator may input corrections for obstacle avoidance or terrain features using steering wheel 160 or another steering control. Ultimately, the operator will finish the second seeding line at step 192.

While following the guidance information provided by GPS receiver 112, new GPS data is collected at step 194. The new GPS data will be used to provide guidance information as described above and will also form the basis for computing any subsequent seeding line as was the case where the GPS data collected while following first seeding line was used to compute the second seeding line. GPS data collection for the second seeding line ends at step 126. Notice that the subsequent seeding line is computed based on the actual path traveled by seeder 110 and not just the expected path computed after the first seeding line was completed. Thus, any deviations of seeder 110 from the computed second seeding line, which were required due to the presence of rocks, trees, etc., will be reflected in the new GPS data and the subsequent seeding line will take into account these corrections.

If a subsequent seeding line is to be planted, a decision made at step 198, guidance information for that seeding line is computed at step 200, with offset information being applied as before. These processes continue until the seeding operations for field 10 are completed at step 202 at which time process 170 quits at step 204. Notice that a decision process at step 202 allows an operator to indicate that a current set of seeding lines have been completed but that the complete set of operations for the field have not been completed. This situation may arise, for example, where different crops are situated in the same field or where a new crop is being planted. In such cases, the operator may indicate that a new set of seeding lines (corresponding to the new conditions) should be initiated, beginning at step 172. In some cases, process 170 may be configured so that only deviations greater than a specified distance from an intended track are recognized. That is, only significant deviations from a computed seeding line guidance path (e.g., the second seeding line discussed above) will be used as decision points for displaying guidance correction information to the user.

Up to this point it has been assumed that the field in which the seeder 110 operates is relatively flat. However, in those situations where seeder 110 will operate over sloping terrain, certain corrections must be accounted for. In particular, it will be appreciated that when seeder 110 is operating on a hillside or other sloping terrain, the boom assembly 122 will have an effectively shorter horizontal seeding (or swath) width (W) than it would have when seeder 110 operates on essentially flat terrain. Indeed, the effective horizontal seeding width of the boom assembly 122 may be approximately equal to the physical length of the boom assembly multiplied by the cosine of the angle of the slope of the terrain (assuming the seeding nozzles do not direct seeds significantly beyond the ends of the boom assembly 122). That is, $$\text{effective horizontal swath width} = \text{physical swath width} \cdot \cos \emptyset,$$

where $\emptyset$ = slope of the terrain.

Figure 8:
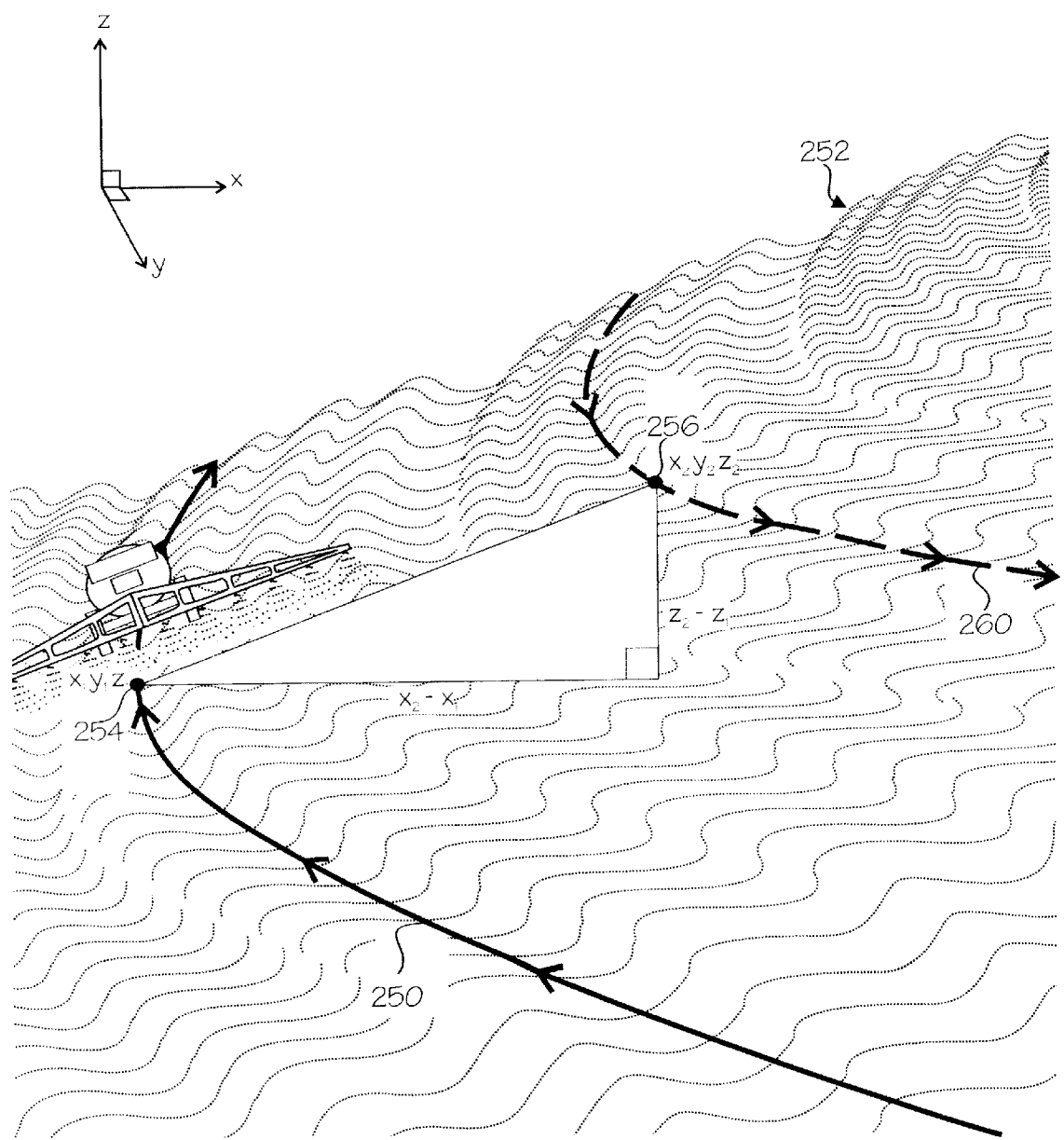
FIG. 8 illustrates exemplary seeding operations on sloping terrain.

This situation is illustrated in FIG. 8 which shows a first seeding path 250 over a hillside 252. During seeding operations, seeder 110 traveled along the first seeding line 250 and reached a position 254 defined by coordinates $x_1$, $y_1$, $z_1$. Now on the return path, seeder 110 needs to be guided to a position 256 which is offset from position 254 by the effective seeding swath distance. Position 256 is defined by coordinates $x_2$, $y_2$, $z_2$ and, assuming that $y_1 \simeq y_2$, then $$x_2 \simeq \text{swath distance} \cdot \cos[\tan^{-1}((z2-z1)/(x2-x1))].$$

GPS receiver 112/processor 114 will have computed $x_1$ and $z_1$ while seeder 110 was traveling along form line 250. Further, positions $x_2$ and $z_2$ will be computed from GPS data received while seeder 110 is traveling along the second form line 260. It will be appreciated that by the time seeder 110 reaches position 256 and computes $x_2$ and $z_2$, seeder 110 may have actually passed position 256. Thus, the guidance information may be late. However, because GPS receiver 112 computes new positioning data several times each second, the distance traveled by seeder 110 will be insignificant. In addition, guidance smoothing and predictive filters (e.g., Kalman filters) can be employed to reduce the effects of this lag time between the receipt of new GPS data and the calculation of guidance information.

In alternative embodiments, where seeder 110 is equipped with GPS antennas 130 at either end of boom assembly 122 GPS receiver 112 may compute the elevations of each end of the boom assembly 112, and thereby derive the slope of the terrain (i.e., the angle $\emptyset$). This information could then be used to compute the effective horizontal swath width as described above, eliminating the need for guidance and predictive filters as may be required in a single antenna situation. This concept may be expanded to equip seeder 110 with three antennas, two on boom assembly 122 and one positioned (for example) on the cab of tractor 128, to allow the computation of three elevation parameters. This may be useful for undulating terrain where not only horizontal slope (i.e., roll), but also longitudinal slope (i.e., pitch) must be accounted for.

A further embodiment may equip seeder 110 as described in U.S. Pat. No. 5,268,695 to Dentinger et al. (the "'695 patent"), assigned to the Assignee of the present invention. The '695 patent describes methods and apparatus for differential phase measurement through antenna multiplexing and the entire disclosure is incorporated herein by reference. In one embodiment, multiple GPS antennas are connected to a GPS receiver so that a carrier signal received by the antennas is time multiplexed through a single hardware path to the receiver where a reference oscillator is used to compare the phase of the signal from each antenna to the phase of a reference signal. One of the antennas is designated as the reference antenna and the carrier signal received by the reference antenna is used to phase lock the reference signal generated by the reference oscillator. The phase of the same carrier signal received by the other antennas is periodically compared to the phase of the reference signal and each comparison results in a single phase angle measurement for the respective antennas compared to the reference antenna. The computed phase angle measurements allow for the calculation of the angle of inclination of a plane in which the multiple antennas are situated. Thus, using such a system, the angle of inclination of the boom assembly 122 could be computed and, hence, the effective horizontal swath distance derived.

Figure 9A:
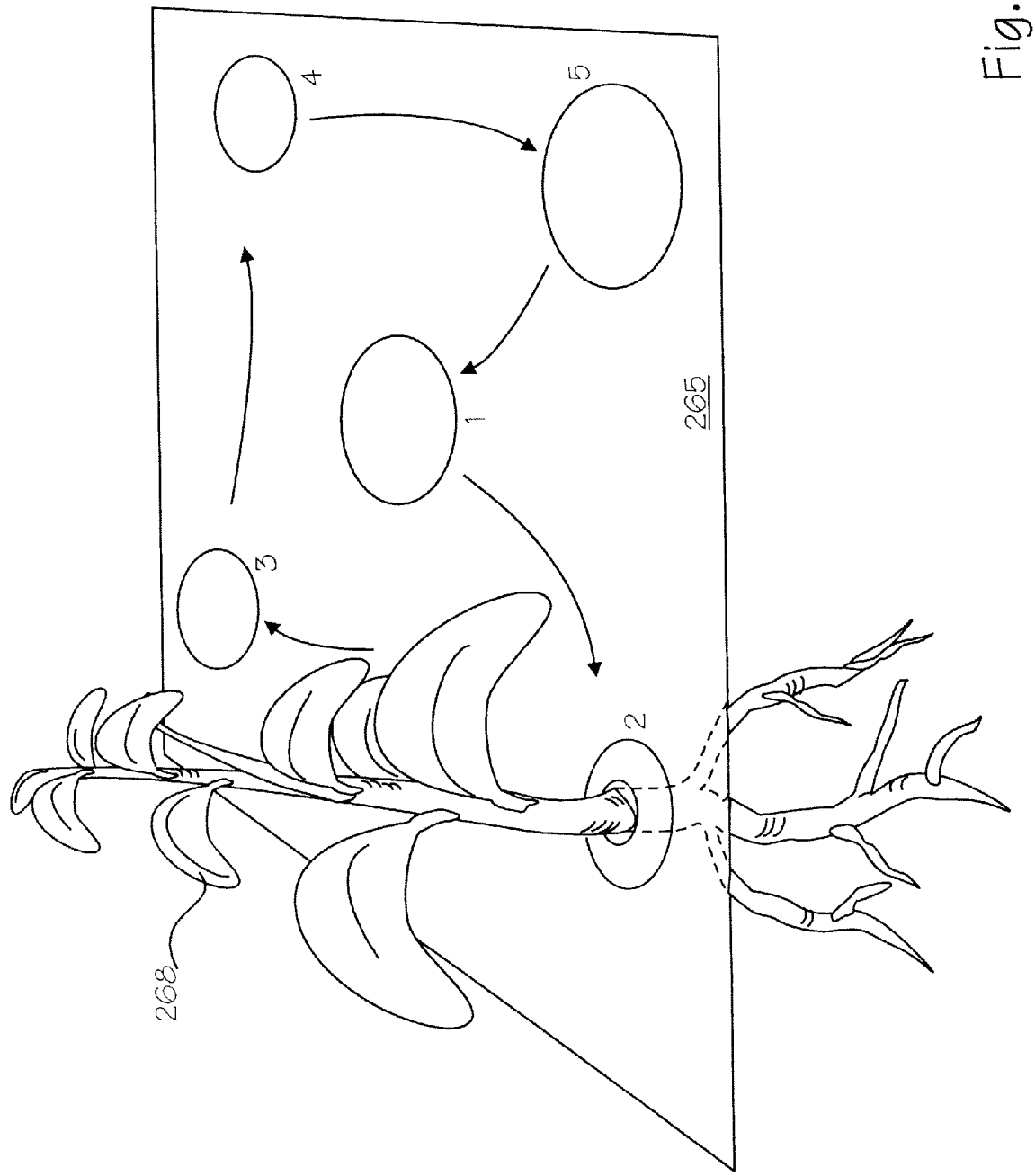
FIG. 9A illustrates micro crop rotation methodologies which are possible using seeding operations performed in accordance with an embodiment of the present invention.

As part of the above-described seeding operations, the use of RTK GPS technology as described herein may provide means for micro crop rotation. Micro crop rotation, as the term implies, refers to the rotation of the position of crop plant position within a small area of field. In one particular embodiment, as shown in FIG. 9A, the digital map may be subdivided into a number of crop rotation zones 265. Within each crop rotation zone 265, one plant 268 is planted per planting period (e.g., semi-annually, annually, etc.) and the position of the plant 268 within the crop rotation zone 265 is varied from planting period to planting period. FIG. 9A illustrates an exemplary rotation scheme for five planting periods.

By shifting the actual position at which the plants 268 are planted within the crop rotation zones 265, the methodologies described herein help to ensure that these plants will grow in fertile soil. The crop rotation scheme is carried out at the centimeter-accurate level and adjoining crop rotation zones 265 may have different rotation patterns to improve plant separations and allow the crops to grow unmolested by one another. Micro crop rotation at this level also helps to reduce the fallow time required to leave a field dormant.

Figure 9B:
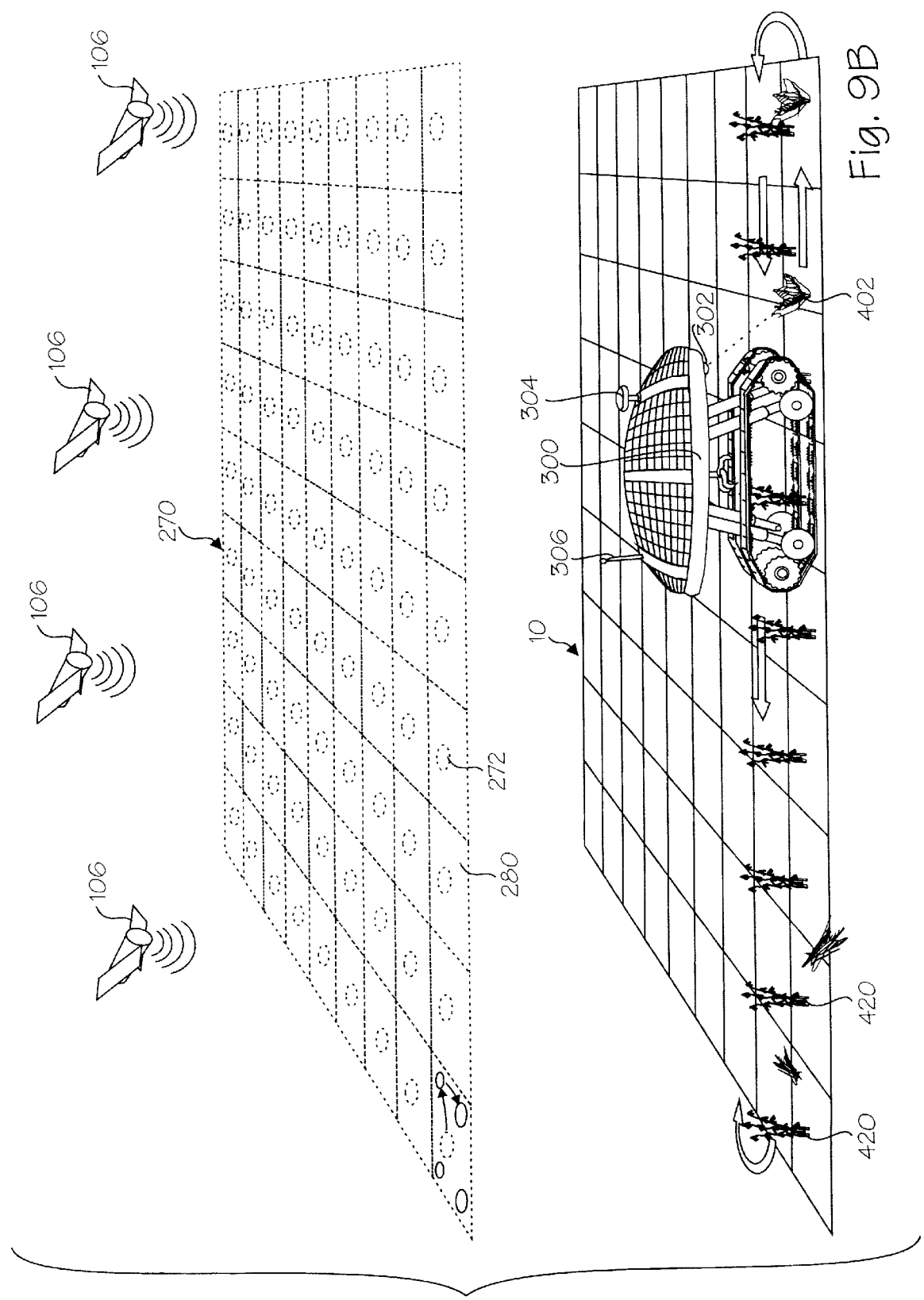
FIG. 9B illustrates an autonomous vehicle operating in accordance with one embodiment of the present invention.

FIG. 9B now illustrates how the digital map 270 created during the above-described planting operations (or otherwise available from GIS 2 or a similar data structure) may be used by a vehicle 300 to locate and destroy undesired plant growth (e.g., weeds) within field 10. Digital map 270 is illustrated as a virtual representation of field 10 and it should be appreciated that this illustration represents data that may be stored in a memory or other computer readable medium. The digital map 270 may also provide guidance information for the fully autonomous vehicle described below by providing a preprogrammed route or pattern (e.g., stored in memory on-board the vehicle). This route or pattern may be a series of GPS coordinates with sufficient accuracy to perform the tasks discussed below. Digital map 270 may also include a plurality of plant areas 272. Each plant area 272 is a representation of where a seed 119 was planted by seeder 110 during the seeding operations. Each plant area 272 may be appropriately sized to take into account the expected dimensions of the type of plant or crop planted within field 10. In other words, plant area 272 represents more than just the precise position at which a corresponding seed 119 was deposited. Instead, plant area 272 preferably represents an area over which expected plant or crop growth may be found (e.g., for the particular time at which the weeding operations are taking place, or just in general).

Each plant area 272 is located in an associated crop rotation zone 265 and may be based on the actual location at which a plant was planted, taking into account any expected plant growth.

The task of vehicle 300 is to make use of digital map 270 in determining whether any undesired plant growth (e.g., weeds) has sprouted in field 10. By knowing the position of desired plant growth, i.e., the plant areas 272, vehicle 300 may locate and detect other plant growth which is not within a plant area 272. For example, vehicle 300 may be fitted with a sensor package 302 which is capable of identifying plant growth or other targets of interest. Sensor package 302 may comprise a chlorophyll detector such as those used by the WEED-IT selective weed control system developed by Kamps de Wild B. V., Zevenaar, The Netherlands. Other sensors which may identify weeds and other plant growth based on their reflective characteristics (e.g., video cameras and/or infra-red detectors) may be substituted for the chlorophyll detectors or, indeed, used in conjunction with the chlorophyll detectors. See, e.g., D. C. Slaughter et al., "Computer Vision Guidance System for Precision Cultivation", *Paper No.* 97-1079. 1992 *ASAE Annual International Meeting.* Aug. 10–14, 1997, the complete disclosure of which is incorporated herein by reference.

When chlorophyll (or another plant characteristic targeted by sensor 302) is detected, it is a good indication that a plant, or plant-like material, has been found. Sensor 302 is positioned on vehicle 300 such that its location relative to GPS antenna 304 is known. Thus, when a target is detected by sensor 302, the position of the target can be determined based on precise positioning information provided by an onboard RTK GPS receiver coupled to antenna 304. Exemplary RTK GPS receivers which may find application in the present scheme include the Ag 122/132 receivers, available from Trimble Navigation, Ltd. of Sunnyvale, Calif. In some cases, the RTK GPS receiver may be located within the same housing as antenna 304. The onboard RTK GPS receiver also receives RTK data from an RTK reference station via antenna 306 in the conventional fashion. As vehicle 300 operates within field 10, sensor 302 can thus locate various plants and vehicle 300 can determine the positions thereof with respect to known plant locations from digital map 270. It is expected that the detection of unwanted vegetation will be accomplished in a region nearby where desired plant growth is known/expected to exist. In most cases, the chlorophyll detector sensitivity will require that the detector be close enough to the undesired plant growth that an on-board plant eradication mechanism (e.g., an auger and/or herbicide sprayer) can automatically perform eradication operations in the region directly in front of the sensor so as to eliminate the undesired plant growth without disturbing the desired plant growth.

In some cases, machine vision-related technology may be used to assist in deploying the plant eradication mechanism. For example, vehicle 300 may include a video camera as part of sensor package 302. The video camera may be used to capture an image of the region in front of vehicle 302. The image may thus include a representation of the undesired plant growth detected by the chlorophyll detector and the auger or other plant eradication mechanism may be deployed so as to be directed at the centroid of that representation. Such systems may be similar to "pick and place" equipment commonly used in the manufacture of electronic components and/or the planting of some crops. For example, robot machinery which makes use of video capture technology such as that described above is often used to place small parts, such as integrated circuits and the like, on printed circuit boards prior to soldering. Camera depth of field and the video pattern recogniation software could be adjusted so as to only recognize weeds of a certain size, etc.

In addition to allowing for precise targeting of the plant eradication mechanism, in such a system the image obtained by the video camera may also be used to compare the representation of the undesired plant growth to a library of stored representations in order to classify or otherwise identify the undesired plant growth. The ability to determine which variety of weed, for example, is growing in a certain area may allow users of vehicle 300 to better choose which herbicide or other eradication means to deploy.

FIGS. 10A–10C illustrate vehicle 300 in further detail. In general vehicle 300 includes a housing 340 and a propulsion unit 350 coupled thereto. One example of an autonomous vehicles which utilize similar technology (although without the novel features of the present vehicle 300) is the Nomad robotic system developed by NASA's Intelligent Mechanism Group at the Ames Research Center and the Robotics Institute at Carnegie Mellon University. A complete description of the technical features of the Nomad robotic vehicle may be fount at http://img.arc.nasa.gov/Nomad/ and related links. Housing 340 may include the RTK GPS receiver, or other precise positioning apparatus, which, in general, may be part of a guidance computer 360. Guidance computer 360 receives inputs from sensor package 302 which, as indicated above, may be configured to detect plant growth. Together, guidance computer 360 and sensor package 302 make up a sensor-controller apparatus which is configured to detect a target, at least in part, according to the location of vehicle 300 (i.e., as determined by the RTK GPS receiver). Guidance computer 360 may also provide guidance commands to drive motors 364 which, in general, will be part of propulsion unit 250. In this way, the guidance computer 360 can provide navigation or other guidance commands to the drive motors 364 to control the movement of vehicle 300.

Drive motors 364 may be powered in any of a number of ways. For example, drive motors 364 may be gasoline powered, in which case a gasoline (or other fuel) tank will be required on board vehicle 300. Preferably, however, vehicle 300 will be configured to operate for extended periods in one or more fields. Thus, the drive motors 364 are preferably operated using batteries 366 which are charged using solar cells 368, fitted within housing 310. Drive motors 364 receive guidance commands (e.g., forward, reverse, speed) from guidance computer 360 and motor control unit 369. Motor control unit 369 provides an interface between guidance computer 360 and drive motors 364 and may convert digital and/or analog signals from guidance computer 360 to voltage and/or current signals to operate drive motors 364. Such control of DC motors (which are preferably used for drive motors 364) is well known to those of ordinary skill in the art.

Also included onboard vehicle 300 may be sonar collision avoidance sensors 370. The sonar collision avoidance sensors 270 may provide inputs to guidance computer 260 to prevent guidance computer 360 from piloting vehicle 300 into an obstacle. In general, the sonar collision avoidance sensors 370 will provide a indication to guidance computer 360 of how close an obstacle may be. The use such collision avoidance systems is well known in the art. See e.g., Raymond C. Daigh "High Reliability Navigation for Autonomous Vehicles," *Trimble Users Conference Proceedings* pp. 133–143, 1996, which is incorporated herein by reference. Other collision avoidance sensors (e.g., infra-red sensors) may be used in place of or in addition to the sonar sensors.

The guidance computer 360 may also be configured with a transmitter apparatus to broadcast emergency or other messages, for example in the case where vehicle 300 becomes disabled or encounters problems with its operations. Preferably, as part of such messages, the position of vehicle 300 (as reported by the precise positioning means) is transmitted so as to allow for easy location of vehicle 300 by human operators, etc. Further, vehicle 300 may include within housing 340 one or more actuators 385. In this particular case, actuators 385 drive one or more augers 390 which may be used to remove weeds. In addition, a herbicide tank and associated spraying nozzles (not shown) may be included.

FIGS. 11a–11f illustrate exemplary operations of vehicle 300 within field 10. To begin, in FIG. 11a, vehicle 300 will have already been provided with digital map 270. Preferably, digital map 270 is stored (e.g., in volatile or non-volatile memory accessible by guidance computer 360) on-board vehicle 300. However, in some cases, digital map 270 may be stored at another location and may be accessed by vehicle 300 (i.e., guidance computer 360) via a radio (or other) link (e.g., using antenna 306). Also, guidance computer 360 will be programmed to conduct operations within field 10, for example, by traversing each row of plants or crops within the field 10. Notice that vehicle 300 is provided with sufficient ground clearance to avoid the growing plants or crops 420. For the case where the plants or crops 420 are relatively tall, vehicle 300 may be configured to operate in trenches or other paths beside the rows of growing plants and crops. Also, vehicle 300 is shown with optional treads 380, making this embodiment of vehicle 300 a "tracked vehicle". The use of treads 380 provides stability and "all weather" capability. However, other configurations are possible, for example, conventional tires or even solid wheels or rollers.

As vehicle 300 operates in field 10, it receives GPS information from satellites 106 and RTK data (via antenna 306) from an RTK reference station (not shown). This allows the RTK GPS receiver onboard vehicle 300 (e.g., which may be part of guidance computer 360) to determine the precise position of vehicle 300 (e.g., to within a few centimeters). For those situations where vehicle 300 will be operating in areas which do not provide clear views of the sky (and, thus, may be subject to GPS outages) vehicle 300 may be filled with a dead reckoning system similar to that described by Daigh. However configured, vehicle 300 uses the precise positioning information provided by the onboard RTK GPS receiver and/or the dead reckoning system to determine its position. That position may then be used to determine whether a weed (or other undesired plant growth) has been located as follows.

Figure 11A:
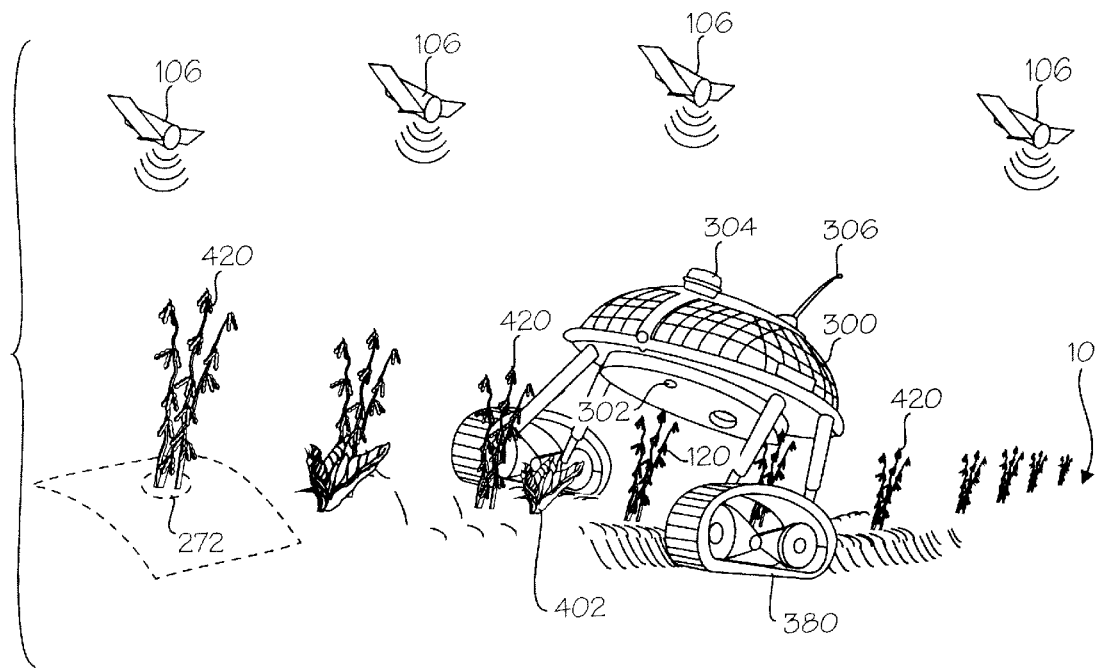
FIGS. 11a–11f illustrate a weed destruction operation performed in accordance with one embodiment of the present invention.
Figure 11B:
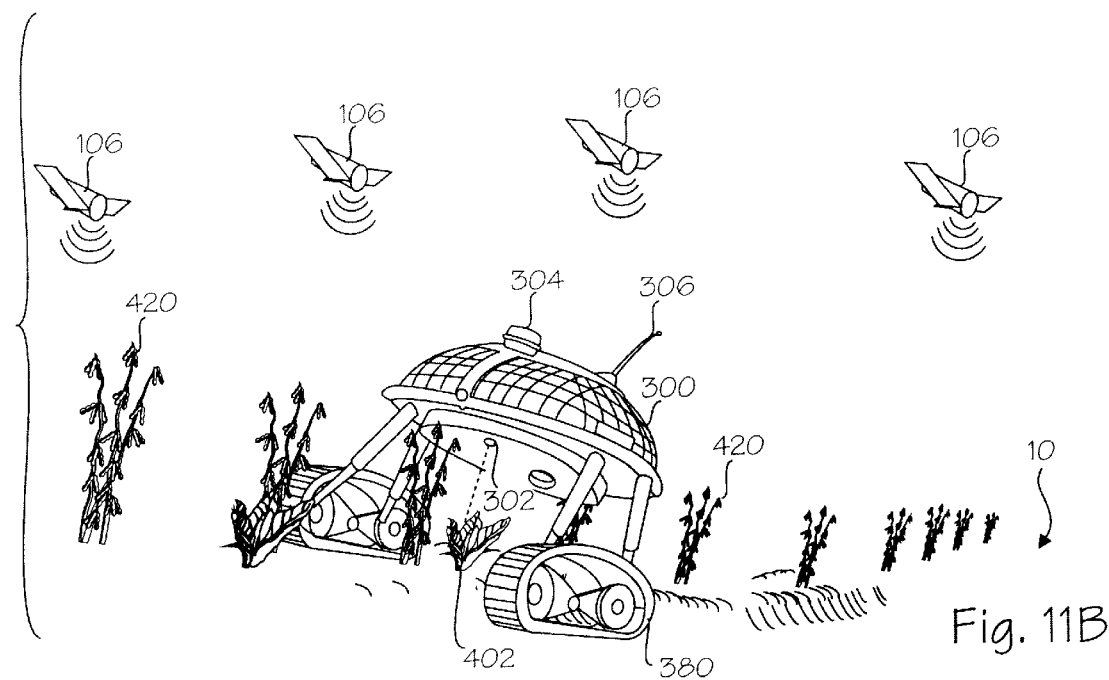

In FIG. 11b, vehicle 300 has reached a position in field 10 such that sensor 302 has detected the presence of a plant 402. This may be accomplished using a chlorophyll detector or other sensor means (e.g., infra-red and/or video analyzers). Having thus detected a plant 402, vehicle 300 must determine whether it is desired plant growth or undesired plant growth. To make this determination, vehicle 300 (e.g., guidance computer 360) access digital map 110 and compares its current position (as determined by the onboard precise positioning means) to the plant areas 272 defined in digital map 110. If this comparison indicates that vehicle 300 is within a plant area 272 (i.e., that sensor 302 has detected plant growth within a plant area 272), the detected plant 402 is classified as desired plant growth. Thus, a "no weed" decision is reached. On the other hand, if the position comparison determines that the detected plant 402 is not within a plant area 272, then the plant 402 is classified as undesired plant growth (i.e., a "weed" decision is made). As shown, the size and configuration of plant areas 272 are configurable depending on the type of crop planted and the period of time (e.g., immediately after seeding, during the growing season, close to harvest, etc.) when vehicle 300 is operating.

If a "no weed" decision is reached, vehicle 300 proceeds with its operations in field 10. Preferably, the weed/no weed decisions are made on-the-fly, so that vehicle 300 need not pause each time it detects a plant. It is expected that vehicle 300 will travel slowly enough within field 10 that this on-the-fly computation will be possible.

Figure 11C:
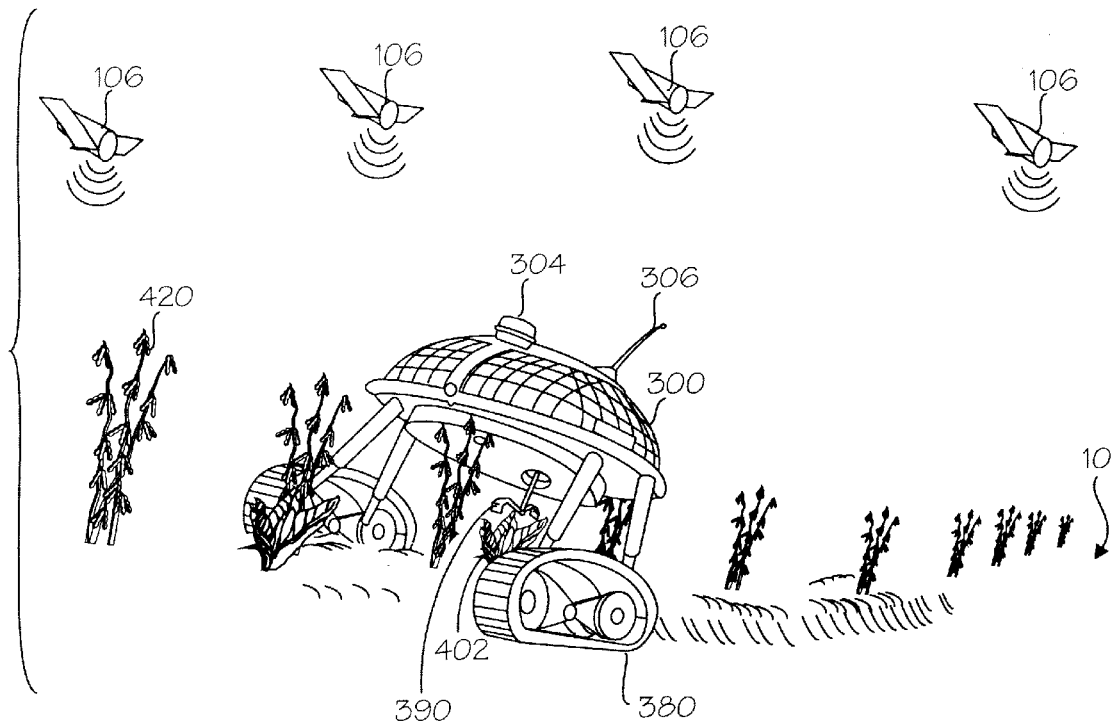

If a "weed" decision is reached, however, vehicle 300 invokes its weed removal routine. As shown in FIG. 11c, vehicle 300 positions itself over the weed 402 so that one of the onboard augers 390 is above weed 402. This position calculation is relatively straight forward as vehicle 300 is capable of determining its position (i.e., the position of antenna 304) to within a few centimeters and the location of auger 390 within housing 340 is at a known offset. Thus, when a weed decision is made, guidance computer 260 provides the appropriate commands to drive motors 364 (e.g., via motor control unit 369) to move vehicle 300 to a position such that auger 390 is located appropriately, for example directly above weed 402. Note, machine vision techniques and systems may be used to assist in these operations as discussed above.

Figure 11D:
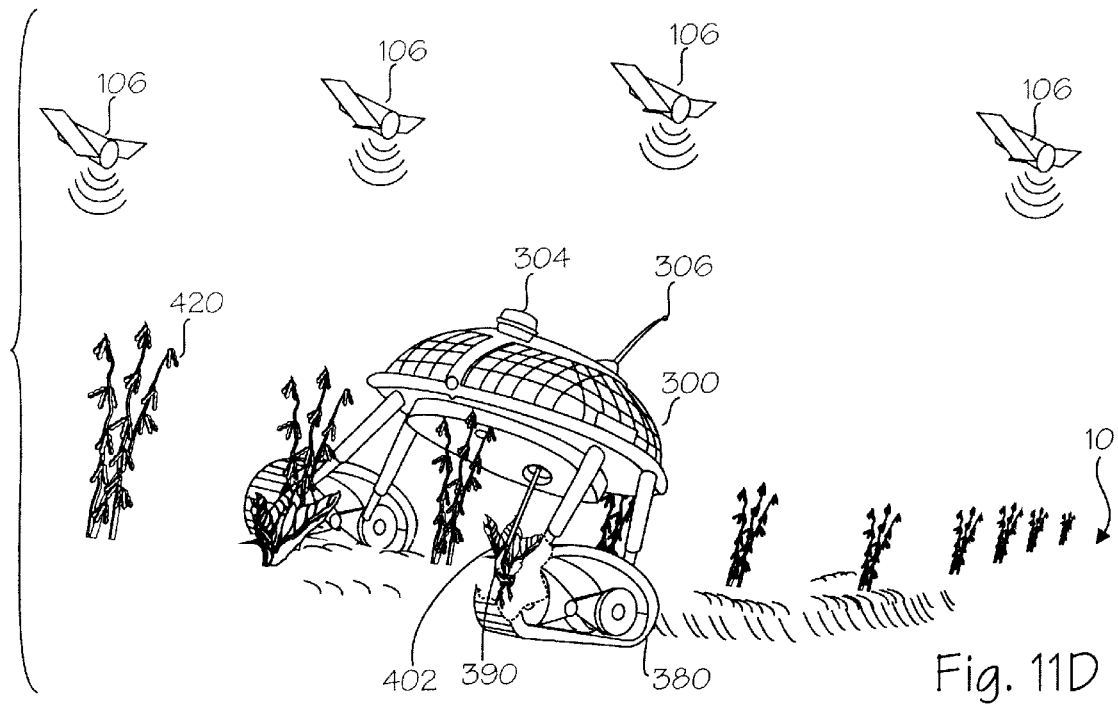

Once vehicle 300 is properly positioned above weed 402, auger 390 is engaged and, as shown in FIG. 11d, is used to dig up or otherwise destroy weed 402. At or about the same time, a weed herbicide may be deployed (e.g., from onboard nozzles if vehicle 300 is so configured). Auger 390 may be appropriately sized so as to be capable of removing expected size weeds from field 10. In general, it is expected that a working end of a few inches will be sufficient for auger 390. Of course, other size augers 390 may be included.

Figure 11E:
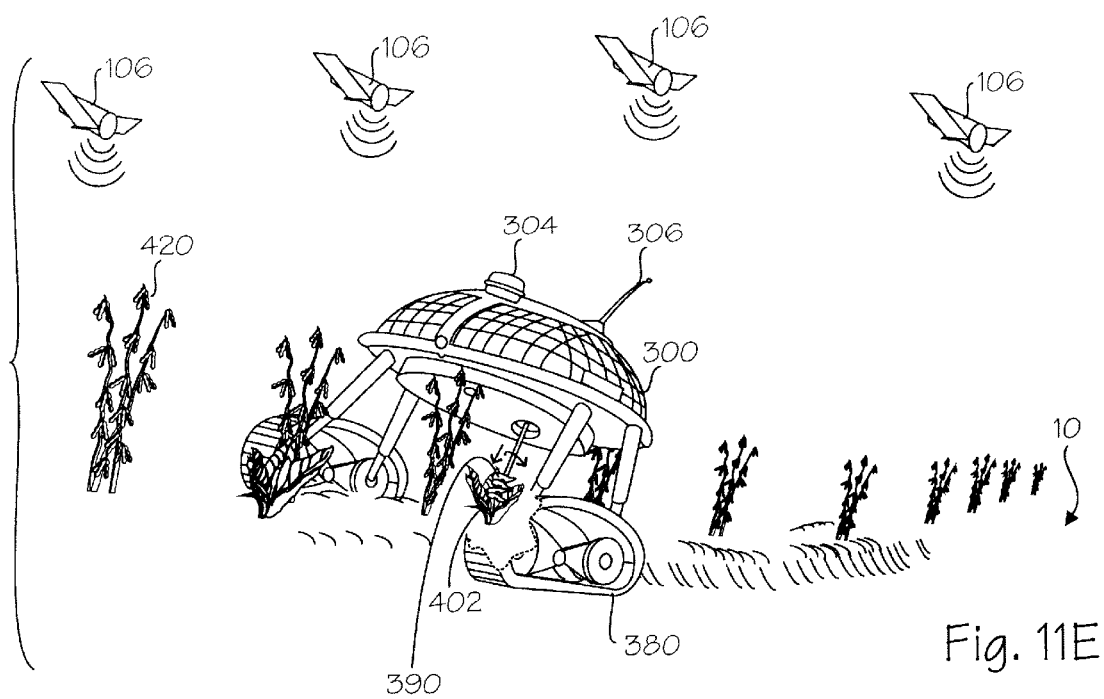
Figure 11F:
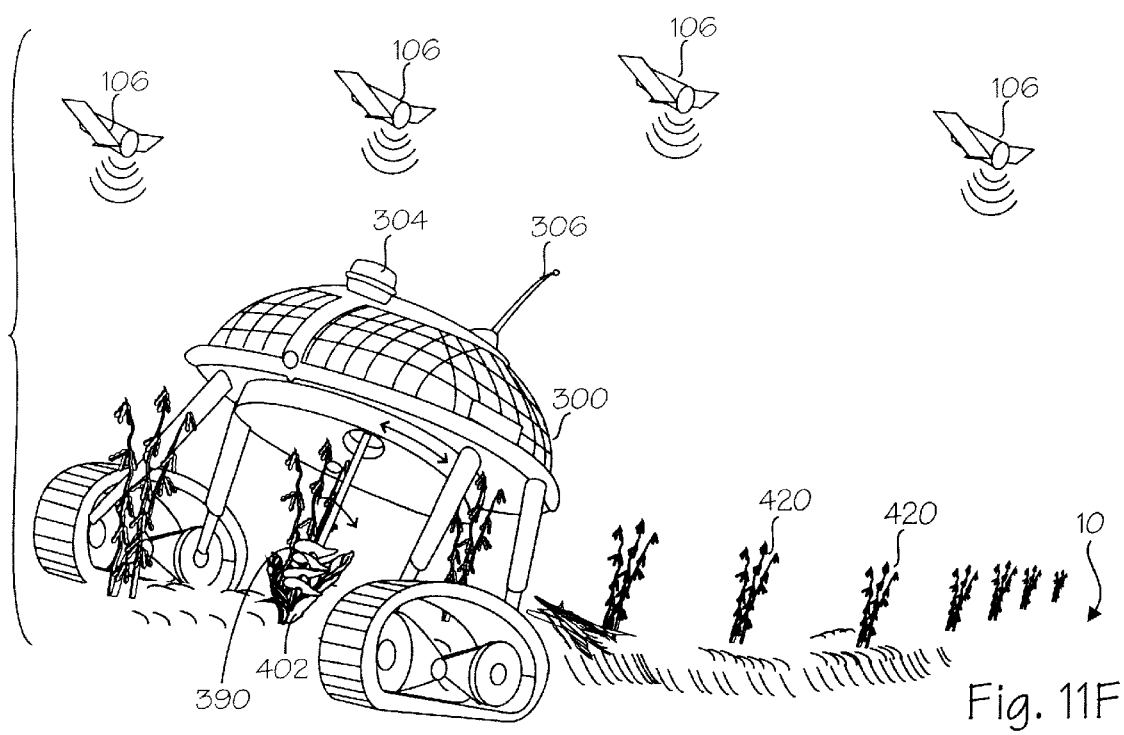

Once weed 402 has been destroyed (e.g., after a specified time for auger 390 to operate), auger 390 is retracted, as shown in FIG. 11e. Once so retracted, vehicle 300 moves on and continues operations in field 10. FIG. 11f shows vehicle 300 engaged in further weed removal operations at a later point in field 10.

FIG. 12 illustrates the functional components of vehicle 300. As shown, a decision making apparatus 460, for example a processor which is part of guidance computer 360, receives inputs from an onboard RTK GPS receiver 440, sensor package 450, and digital map 270. RTK GPS receiver 440 provides a precise position input, which may be augmented with a dead reckoning input from a dead reckoning system 470 as discussed above. Sensor package 450 provides an indication of plant growth (e.g., chlorophyll) as an input. Digital map 270 provides an indication of the plant areas 272 as discussed above. The various inputs are combined to determine whether or not a detected target is desired plant growth or undesired plant growth (i.e., a weed). The result of the decision is output as a decision result 480.

As shown in FIG. 13, the decision result 480 may be applied directly to an actuator (e.g., an auger 390 and/or herbicide sprayer) or may be overridden in the event of some abort condition. In general, the decision result will be a digital output, for example a logic 1 for a "weed" decision and a logic 0 for a "no weed" decision. This digital value will need to be translated to mechanical action by the actuator using conventional digital control system techniques. For example, the drive motors 364 may be decoupled from the propulsion unit 350 and used to drive the auger 390 via a belt drive, direct drive or other drive system. In other cases, auger 390 may have its own drive motor arrangement, powered from battery 366. In such a case, the decision result may be applied to that drive motor arrangement to control the action of auger 390.

As shown, there may be times when some other information 484 indicates that, even though a weed has been detected, the action of auger 390 should be aborted. For example, if the charge of battery 366 is very low, vehicle 300 may decide to delay weed destroying operations (e.g., via override stage 486) until sufficient charge is available to operate auger 390. In such cases, vehicle 300 may cease operations to charge battery 366 or vehicle 200 may simply store the location of weeds it has detected in digital map 270 for later action/removal. Otherwise, the actuator command 490 may be provided to actuator 385.

Figure 14A:
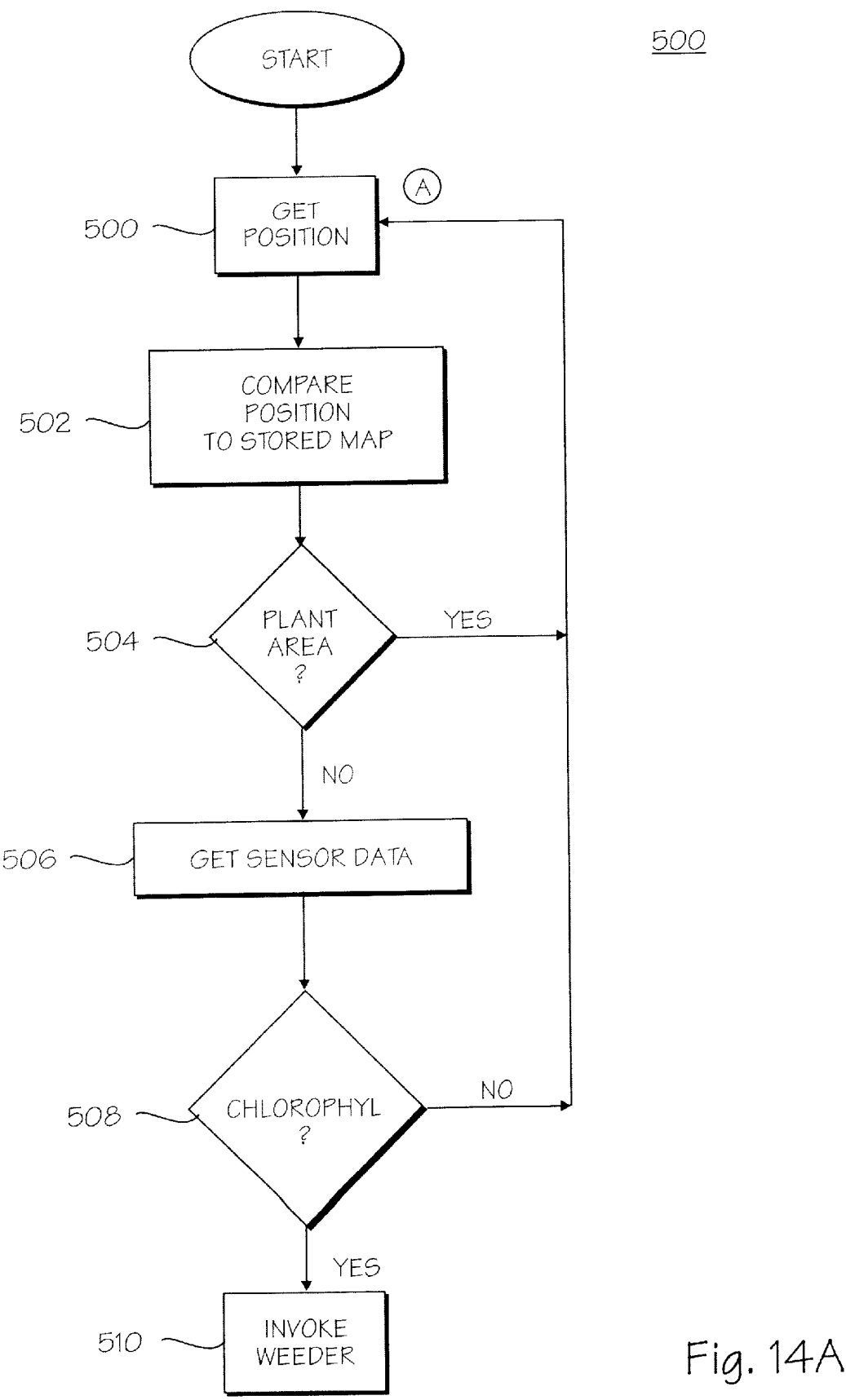
FIGS. 14A–14B are flow diagram illustrating a method of removing weeds in accordance with one embodiment of the present invention.
Figure 14B:
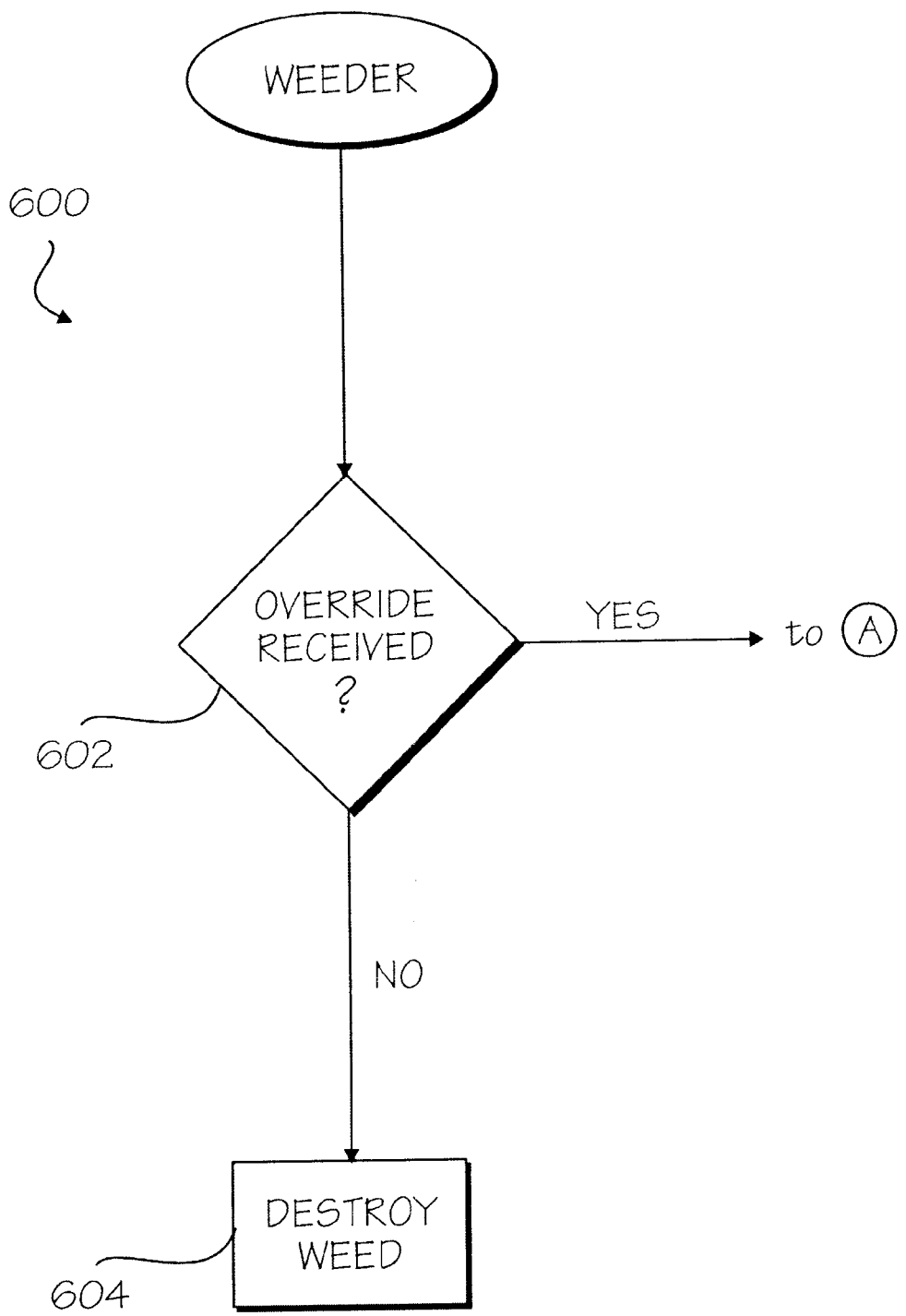

FIGS. 14a and 14b illustrate an alternative method of operating vehicle 300. At step 500, the position of vehicle 300 is determined based upon the information provided by RTK GPS receiver 440 and/or dead reckoning system 470. At step 502, as vehicle 300 is operating in field 10 the current position of vehicle 300 is compared to digital map 270 to determine whether vehicle 300 is in a plant area 272 or not. At step 504, if vehicle 300 is located within a plant area 272 the above process repeats. Once vehicle 300 is outside a plant area 272, at step 506 data from sensor 302 is obtained. A check is made to determine whether sensor 302 has detected chlorophyll at step 508. If not, the above procedure is repeated until chlorophyll has been detected. At step 510, if chlorophyll has been detected it is recognized that the plant growth is undesired plant growth and a weeder routine is involved. Of course, many other methods of operating vehicle 300 are possible. For example, the process of determining the position of vehicle 300 may execute in parallel with the determination of whether sensor 302 has detected plant growth. These routines may then provide outputs to a decision making routine which determines whether any detected plant growth is desired or undesired, based on the position of vehicle 300.

FIG. 14b illustrates weeder routine 600 in further detailed. As indicated above, an optional override procedure at step 602 can be implemented. If no override conditions exist, at step 604 the augers 390 or other actuators are activated and the weed is destroyed.

Figure 15:
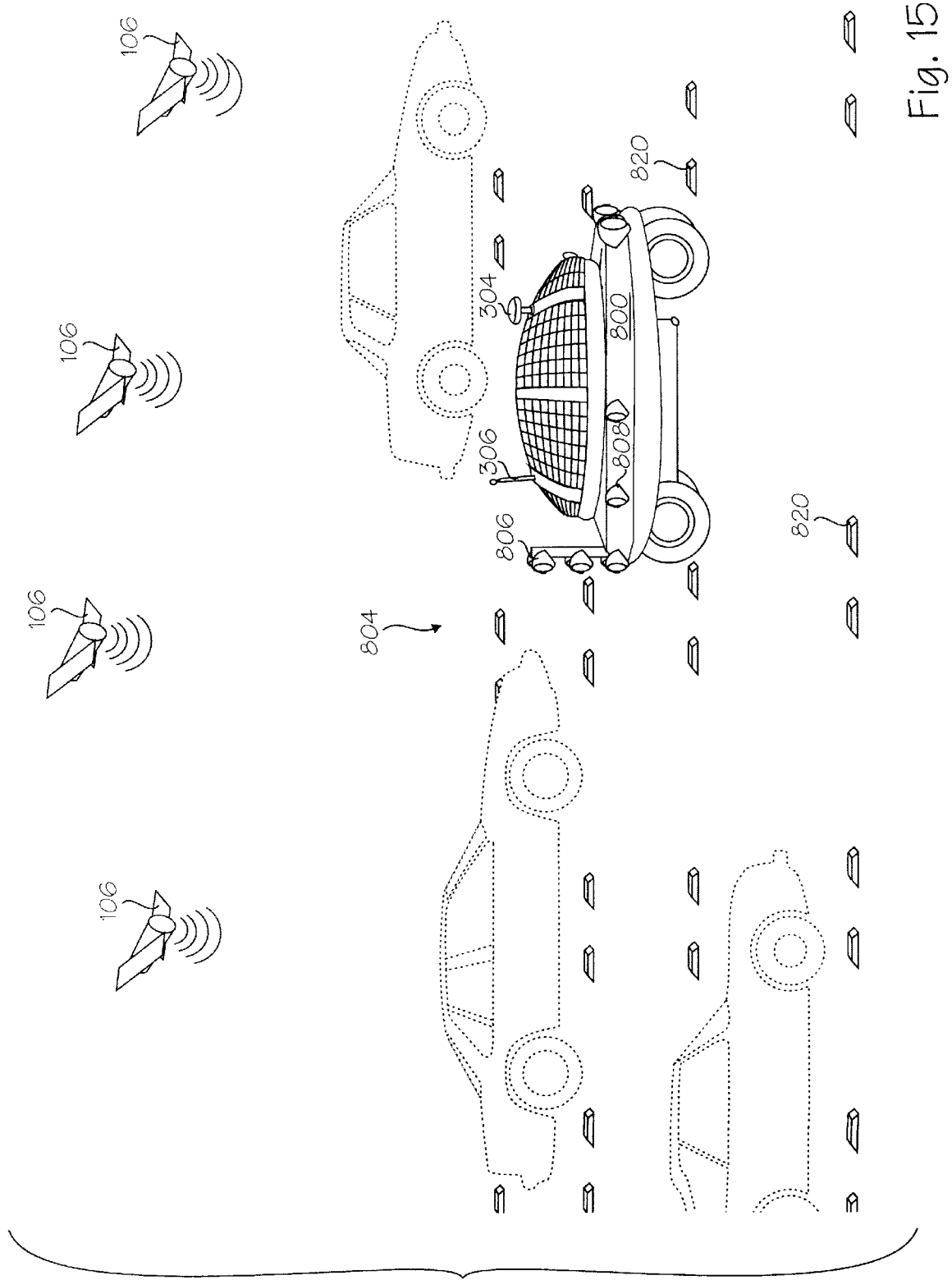
FIG. 15 illustrates a lane marker apparatus configured in accordance with a further embodiment of the present invention.
Figure 16:
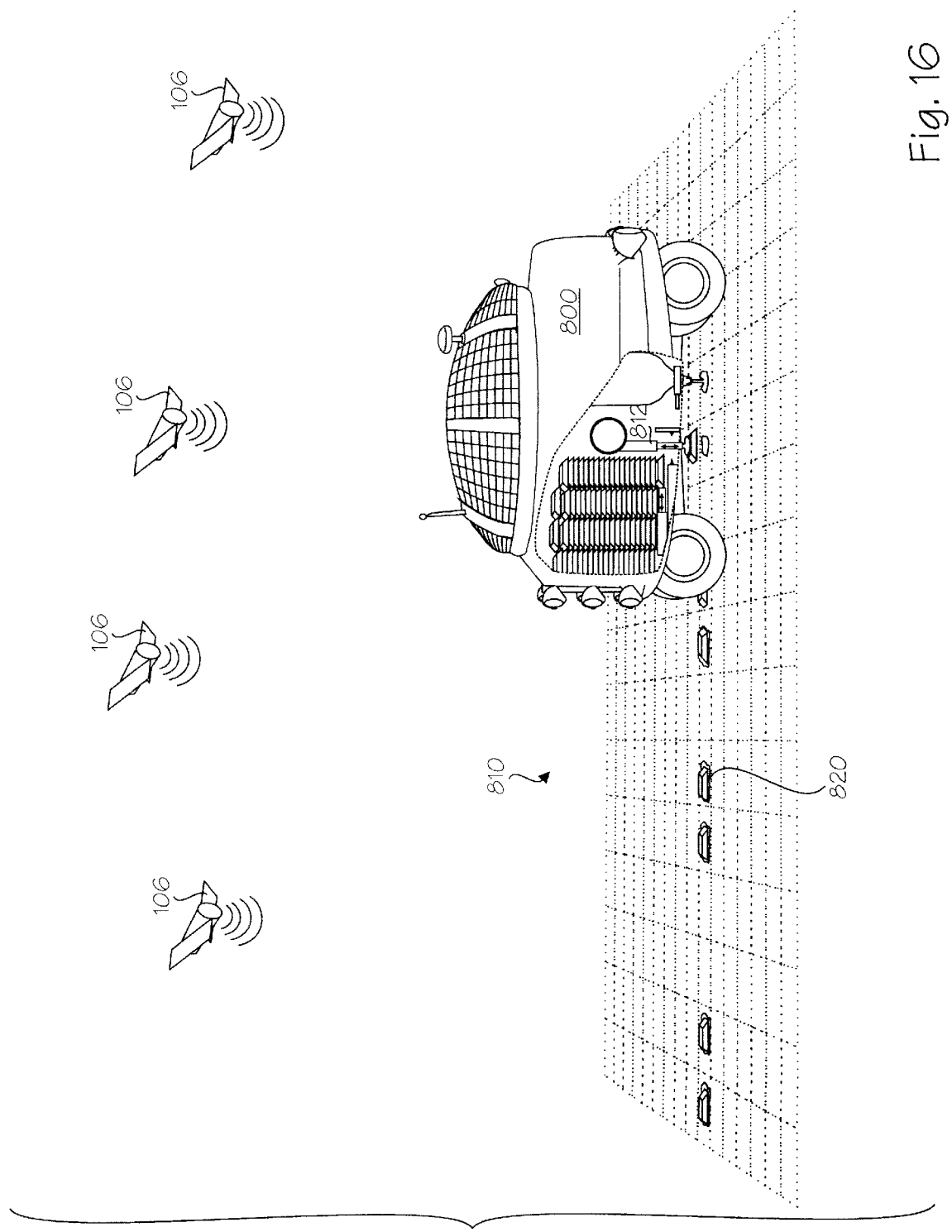
FIG. 16 illustrates the lane marker apparatus of FIG. 15 in more detail.
Figure 17:
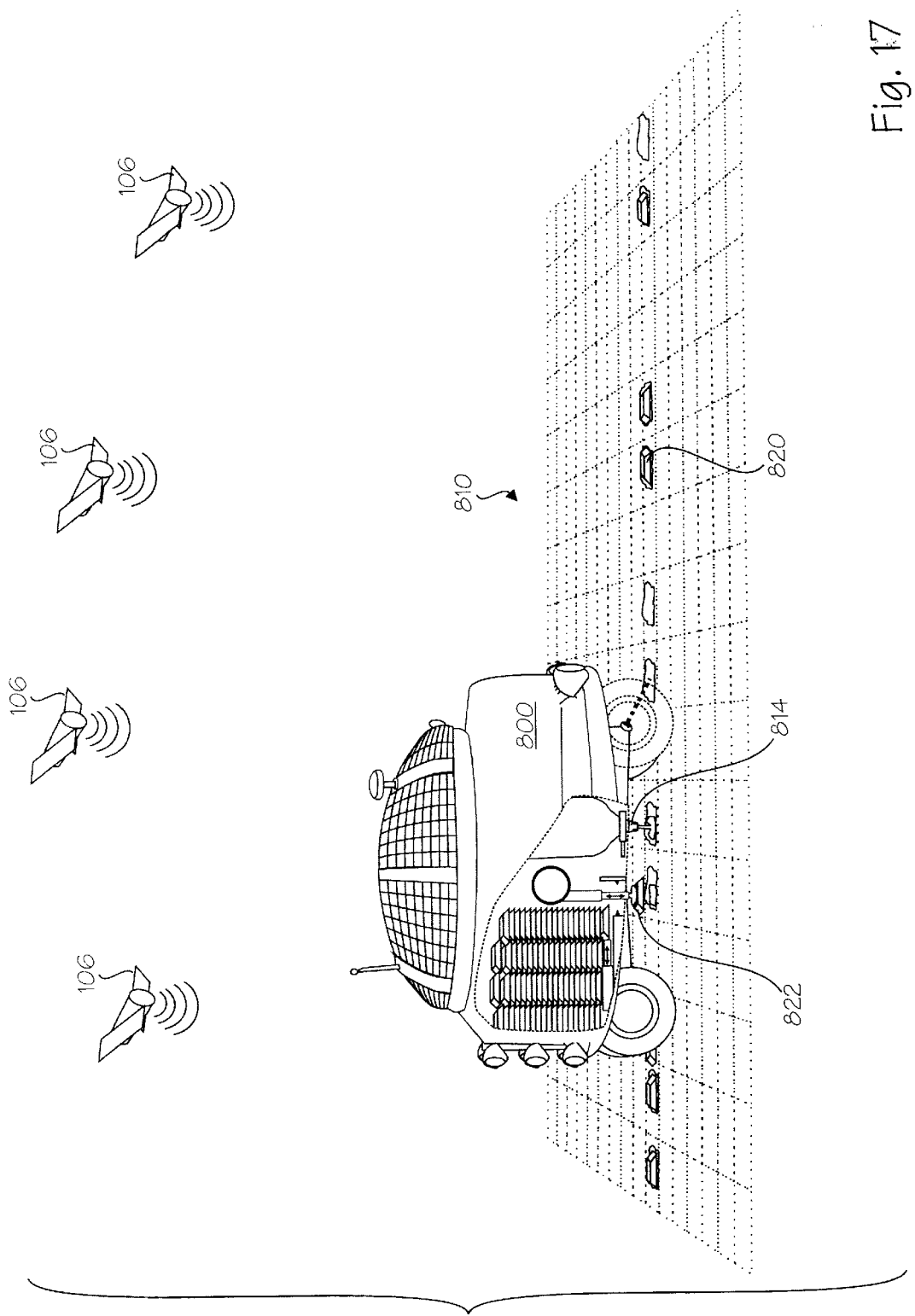
FIG. 17 illustrates a process of applying lane markers in accordance with one embodiment of the present invention.

FIGS. 15–17 illustrate an alternative embodiment of the present invention. In this case, an autonomous vehicle 800 is configured to deposit lane markers 802 on a roadway 804, e.g., where old lane markers have been displaced. Vehicle 800 is configured much like vehicle 300 in that it includes a decision making apparatus (e.g., a guidance computer) that pilots vehicle 800 within roadway 804. The decision making apparatus receives inputs from an onboard RTK GPS receiver, to keep track of its position and to compare that position to a digital map which may be stored onboard or accessed from a remote location via a radio or other link. Also provided within vehicle 800 are sensors, which may be used to detect the presence (or absence) of lane markers 820, and collision avoidance sensors to provide against unknown obstacles. It is also preferable that vehicle 800 is fitted with high visibility markers such as lights 806 and/or acoustic warning devices 808. This allows other users of roadway 804 to be aware of the presence of vehicle 800.

As shown in FIG. 16, a digital map 810 may be created as vehicle 800 lays down lane marker 820, e.g., as roadway 804 is being developed or repaired. This digital map 810 defines the expected location of lane markers 820 for later operations of vehicle 800. Vehicle 800 is equipped with actuator 812 which is designed to affix lane markers 820 to roadway 804 at positions determined by roadway designers and provided to vehicle 800.

Later, as shown in FIG. 17, vehicle 800 may operate along roadway 804, looking for missing lane markers 820. Using a sensor 814, vehicle 800 can determine when a lane marker 820 is missing by comparing its present position (e.g., provided by an onboard RTK GPS receiver) to digital map 810. When digital map 810 indicates, based on the current position of vehicle 800, that a lane marker 820 should be present, and sensor 814 indicates that no such lane marker is in place, vehicle 800 may operate actuator 812 to deposit a new lane marker 822 at the position where a lane marker should have been located.

Figure 18:
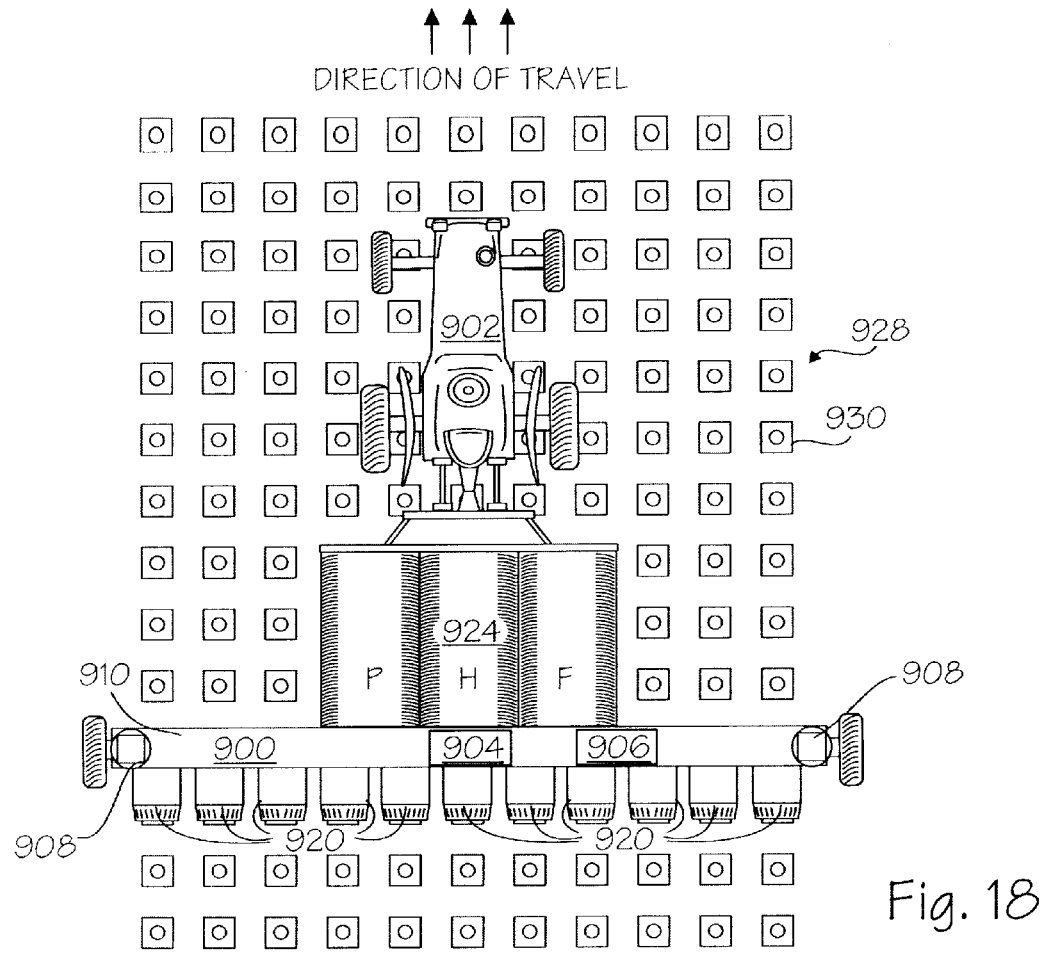
FIG. 18 illustrates a semi-autonomous vehicle configured in accordance with yet another embodiment of the present invention.
Figure 19:
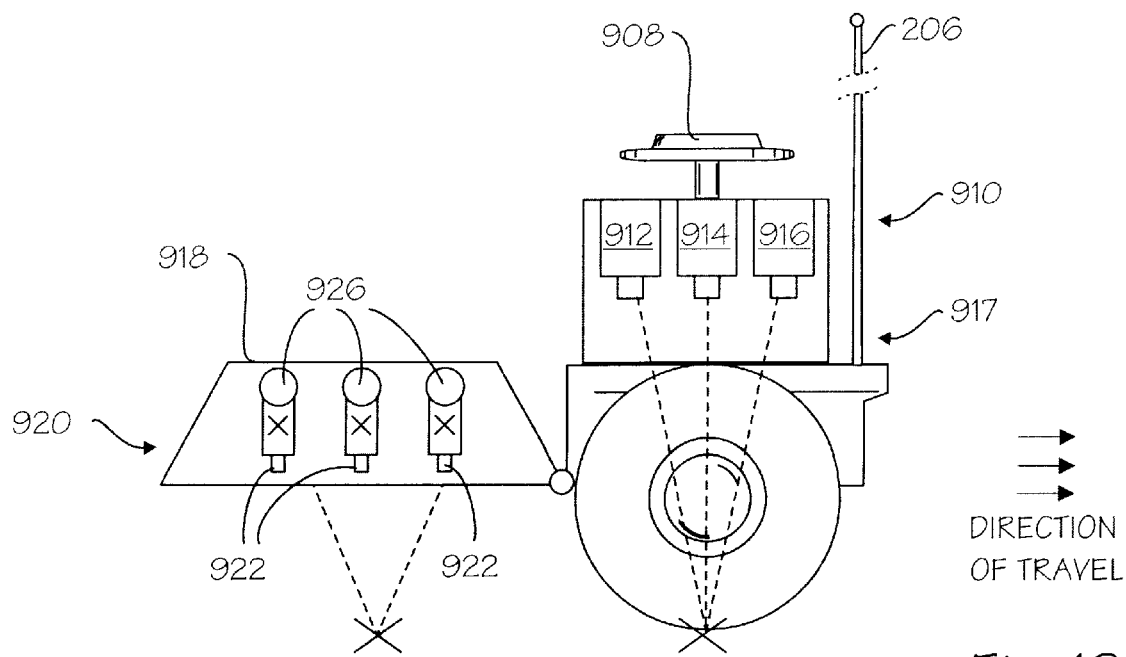
FIG. 19 is a side view of the semi-autonomous vehicle shown in FIG. 18.

FIGS. 18 and 19 illustrate a semi-autonomous variant of the vehicle described above. The semi-autonomous vehicle (which may be referred to as an implement) 900 may be towed behind a tractor 902 or other vehicle which may provide the steering, guidance and power for vehicle 900. Semi-autonomous vehicle 900 includes a sensor-controller arrangement 904 similar to that discussed above and configured to identify a target (i.e., plant growth) according to a sensor input and a position input. In some cases, sensor-controller arrangement 904 may be included on tractor 902 while in other cases it forms an integral part of vehicle 900.

As before, the position input is provided by one or more global positioning system (GPS) receivers, for example, real time kinematic (RTK) GPS receivers 906. For the illustrated embodiment, a single RTK GPS receiver 906 is used, but the receiver 906 collects inputs from a number of GPS antennas 908. The use of multiple antennas 908 allows vehicle 900 to detect any yaw in its boom 910 and modify its plant eradication operations accordingly. The sensor input may be provided by chlorophyll detectors 912, video cameras 914 and/or infra-red detectors 916. Multiple clusters 917 of these sensors 912, 914 and/or 196 may be deployed along boom 910.

Vehicle 900 also includes a plant eradication mechanism 918, for example a sprayer arrangement 920 which includes sprayer nozzles 922 for dispensing a herbicide, a fertilizer and/or a pesticide. Associated tanks or bins 924 for carrying the herbicide, fertilizer and/or pesticide are included, and each tank 924 feeds its associated nozzles via a control valve 926 which may be under the control of the sensor-controller arrangement 904. Thus, in response to control signals from sensor-controller apparatus 904 which open or close the valves 926, herbicide, fertilizer and/or pesticide may be deployed as desired.

As indicated, vehicle 900 includes a boom 910 which supports multiple sensor clusters 917 and multiple sprayer arrangements 920. This allows vehicle 900 to perform plant eradication/fertilization/pest control operations over a wide area for each pass through a field or other cultivated area 928 made by tractor 902. In other cases, a single sprayer arrangement 920 may be used. Preferably, an auger is not used in this embodiment so that the semi-autonomous vehicle 900 need not stop to destroy any weeds, etc. Instead, the vehicle 900 is towed by tractor 902 at a known or measured speed such that the time for deploying herbicide, fertilizer and/or pesticide can be calculated by a decision-making apparatus included within sensor-controller arrangement 904. For example, if the sprayer arrangement 920 is positioned a distance D behind the sensors (i.e., chlorophyll detector 912, video camera 914 and/or infra-red detector 916) and the vehicle 900 is being towed at a speed S, then the time to deploy the herbicide, fertilizer and/or pesticide will be approximately T=D/S, with provision for any delay required for the actual weed/plant sensing operation and the opening/closing of the sprayer nozzles 920 (i.e., their associated control valves 926). Note, in the above example, D more properly represents the point at which the sensors are focused or otherwise pointed, rather than just their physical location onboard vehicle 900.

Thus, the sensor-controller arrangement 904 includes a decision-making unit coupled to receive the sensor input and the position input. The decision-making unit (e.g., a general purpose or special purpose microprocessor, not shown in detail) is configured to use these inputs, along with reference position information, to classify the target (e.g., as a weed or otherwise). The reference position information may be obtained from a digitized map of the field (as discussed above), for example, which may be stored in memory accessible by the decision-making unit. Preferably, the digitized map will include information defining desired plant growth regions 930 so as to aid in classifying the target as desired plant growth or otherwise.

When undesired plant growth is detected, the sprayer apparatus 920 may be used, for example with control signals from the sensor-controller arrangement 904, to apply a herbicide thereto. Alternatively, or in addition thereto, the sprayer apparatus 920 may be used to dispense a fertilizer and/or a pesticide in addition to (or instead of) the herbicide. Thus, while eliminating undesired plant growth, the apparatus may also be used to fertilize desired plant growth and apply pesticides to selected areas to control pests.

As is apparent then, the vehicle control system may used with a vehicle useful for locating and destroying undesired plant growth (e.g., weeds) in a cultivated area or with another purpose, and the vehicle itself may be fully autonomous (e.g., having its own propulsion system) or semi-autonomous (e.g., where it is towed by a tractor or similar means). In one embodiment, it has been shown that the vehicle may include a precise positioning apparatus, for example an RTK GPS receiver with or without an augmenting dead reckoning system, configured to provide real-time precise positioning information regarding the location of the vehicle. The vehicle may further include a sensor-controller apparatus configured to detect a target (e.g., a weed), at least in part, according to the location of the vehicle. A propulsion unit is used to transport the vehicle and may be part of the vehicle itself (e.g., under the control of the sensor-controller apparatus) or an external unit (e.g., a tractor or other vehicle). Collision avoidance sensors may be provided for obstacle detection and/or avoidance.

Whether used with the fully autonomous vehicle or the semi-autonomous vehicle, the sensor-controller apparatus may include a sensor package configured to detect a characteristic of the target (e.g., chlorophyll or infra-red/visible spectrum reflectivity for the case where the target is undesired plant growth) and a decision-making apparatus coupled thereto. The decision-making apparatus is configured to combine inputs from the sensor package, the precise positioning apparatus and a stored map of an area in which the vehicle operates to produce a decision output. An actuator within the vehicle is configured to response to the decision output of the decision-making apparatus. In one particular embodiment it was shown that the actuator comprises weed removal means which may include a herbicide deploying mechanism; a rotating, string-based weed remover/cutter and/or an auger. In another particular embodiment the actuator comprises lane marker depositing means which may be used to place lane markers on a roadway.

Thus, a vehicle control system has been described. Although discussed with reference to certain specific embodiments, these exemplary configurations merely illustrate a few of the possible implementations of the present invention and should not limit the generality thereof. Instead, it should be recognized that other operations are possible and, indeed, are contemplated within the spirit and scope of the present invention. For example, using the techniques discussed herein, weeding, cultivating and/or planting operations may be performed by a fully autonomous vehicle or, indeed, a semi-autonomous vehicle. Using either configuration, a fertilization application could be made to an identified crop plant only, excluding any undesired plant growth or plant growth of a desired, but different, type. Further, target applications of specific herbicides and/or pesticides could be carried out. Thus, the present invention allows for any delivery of a product or service to a precise location, based on a sensor input and a position input. Thus, the present invention should only be measured in terms of the claims which follow.

What is claimed is:

1. A vehicle, comprising:
   a global positioning system (GPS) receiver configured to provide real time precise positioning information regarding the location of the vehicle;
   a sensor package configured to detect a characteristic of a target; and a decision-making apparatus coupled to receive inputs from the sensor package and the GPS receiver and configured to identify the target therefrom.

2. The vehicle of claim 1 further comprising a propulsion unit configured to transport the vehicle under the control of the decision-making apparatus.

3. The vehicle of claim 1 wherein the GPS receiver comprises a real-time kinematic (RTK) GPS receiver.

4. The vehicle of claim 3 further comprising collision avoidance sensors coupled to the decision making apparatus.

5. The vehicle of claim 1 wherein the decision-making apparatus is configured to combine inputs from the sensor package, the GPS receiver and a stored map of an area in which the vehicle operates to produce a decision output.

6. The vehicle of claim 5 further comprising an actuator configured to respond to the decision output of the decision making apparatus.

7. The vehicle of claim 6 wherein the actuator comprises weed removal means.

8. The vehicle of claim 7 wherein the weed removal means include herbicide deploying mechanisms.

9. The vehicle of claim 8 wherein the herbicide deploying mechanisms comprise a spray nozzle.

10. The vehicle of claim 6 wherein the actuator comprises lane marker depositing means.

11. The vehicle of claim 10 further comprising an emergency message transmitter configured to transmit the location of the vehicle when activated.

12. The vehicle of claim 1 further comprising a plant eradication mechanism.

13. The vehicle of claim 12 wherein the plant eradication mechanism comprises a herbicide sprayer.

14. The vehicle of claim 12 wherein the plant eradication mechanism comprises an auger.

15. The vehicle of claim 14 wherein the plant eradication mechanism further comprises a herbicide sprayer.

16. The vehicle of claim 14 further comprising a propulsion unit coupled to the vehicle.

17. The vehicle of claim 16 further comprising a housing which includes the decision-making apparatus and at least a portion of the propulsion unit.

18. The vehicle of claim 17 wherein the GPS receiver is included within the housing.

19. The vehicle of claim 16 wherein the propulsion unit is configured to operate under the control of the decision-making apparatus.

20. The vehicle of claim 19 further comprising a collision avoidance sensor coupled to the decision-making apparatus.

21. The vehicle of claim 20 wherein the decision-making apparatus is configured to receive reference position information for use in classifying the target.

22. The vehicle of claim 21 wherein the reference position information is obtained from a digitized map of an area of operation for the vehicle.

23. The vehicle of claim 20 wherein the decision-making apparatus is configured to utilize present position information obtained from the GPS receiver to access stored information for use in classifying the target.

24. The vehicle of claim 23 wherein the stored information comprises a digital map of an operating area of the vehicle.

25. The vehicle of claim 24 wherein the digital map includes information defining desired plant growth regions.

26. The vehicle of claim 1 further comprising a sprayer apparatus coupled to receive control signals from the decision-making apparatus.

27. The vehicle of claim 26 wherein the sprayer apparatus is configured to dispense at least one of a herbicide, a fertilizer or a pesticide.

28. The vehicle of claim 26 wherein the sprayer apparatus is configured to dispense a herbicide, a pesticide and/or a fertilizer under the control of the decision-making apparatus based on a classification of the target.

29. The vehicle of claim 28 wherein the classification of the target is made with reference to previously obtained information regarding an operating area of the vehicle.

30. The vehicle of claim 28 wherein the decision-making apparatus is configured to classify the target according to an input from the sensor package and the GPS receiver.

31. The vehicle of claim 30 further comprising a propulsion unit configured to operate under the control of the decision-making apparatus.

32. The vehicle of claim 31 wherein the sensor package input is provided by a chlorophyll detector.

33. A method comprising determining whether or not a target has been located according, at least in part, to a position of a vehicle, as determined by a global positioning system (GPS receiver, and a sensor input provided to a decision making apparatus which is configured to identify the target from the position of the vehicle and a target characteristic provided by the sensor input.

34. The method of claim 33 wherein the sensor input is provided by a sensor package housed on the vehicle.

35. The method of claim 34 wherein the position of the vehicle is provided by a real-time kinematic (RTK) GPS receiver housed on the vehicle.

36. The method of claim 33 wherein the sensor input is provided by a chlorophyll detector.

37. The method of claim 33 wherein the sensor input is provided by a video camera.

38. The method of claim 33 wherein the sensor input is provided by an infra-red detector.

39. A method, comprising:
defining a first seeding line using position data provided by a geographic information system;
defining a second seeding line using positioning data derived from GPS data and a swathing offset;
updating said second seeding line according to one or more deviations from said second seeding line;
following said second seeding line defined by said positioning data and said swathing offset;
deviating from said second seeding line;
collecting new GPS data during said steps of following and deviating and computing one or more positions therefrom; and
defining an updated second seeding line using said positions.

40. A method as in claim 39 further comprising the step of defining a third seeding line using said positions and said swathing offset.

* * * * *